US006987972B2

(12) United States Patent
Yamashita et al.

(10) Patent No.: US 6,987,972 B2
(45) Date of Patent: Jan. 17, 2006

(54) BASE STATION CONTROL EQUIPMENT, MOBILE STATION EQUIPMENT, AND RADIO COMMUNICATION SYSTEM

(75) Inventors: Atsushi Yamashita, Kawasaki (JP); Akiko Tetsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 578 days.

(21) Appl. No.: 10/157,792

(22) Filed: May 24, 2002

(65) Prior Publication Data

US 2003/0008656 A1 Jan. 9, 2003

Related U.S. Application Data

(63) Continuation of application No. PCT/JP99/06540, filed on Nov. 24, 1999.

(51) Int. Cl.
*H04Q 7/20* (2006.01)

(52) U.S. Cl. .................. 455/442; 455/436; 455/438; 455/439; 371/331; 371/332

(58) Field of Classification Search .............. 445/442, 445/436, 438, 439, 450; 370/331, 332
See application file for complete search history.

(56) References Cited

U.S. PATENT DOCUMENTS

| | | | | |
|---|---|---|---|---|
| 5,926,763 A | * | 7/1999 | Greene et al. | 455/442 |
| 5,974,318 A | * | 10/1999 | Satarasinghe | 455/436 |
| 6,192,246 B1 | * | 2/2001 | Satarasinghe | 455/442 |
| 6,240,275 B1 | * | 5/2001 | H'Mimy et al. | 455/450 |
| 6,321,089 B1 | * | 11/2001 | Han | 455/438 |
| 6,442,151 B1 | * | 8/2002 | H'mimy et al. | 370/332 |
| 6,590,879 B1 | * | 7/2003 | Huang et al. | 370/331 |
| 6,754,191 B1 | * | 6/2004 | Paranchych et al. | 370/331 |
| 6,754,493 B1 | * | 6/2004 | Jetzek | 455/437 |
| 6,782,261 B1 | * | 8/2004 | Ahmed et al. | 455/436 |
| 6,816,472 B1 | * | 11/2004 | Dillon et al. | 455/442 |

FOREIGN PATENT DOCUMENTS

| | | |
|---|---|---|
| EP | 0 884 918 A2 | 12/1998 |
| JP | 08-191481 | 7/1996 |
| JP | 11-69416 | 3/1999 |
| JP | 11-215536 | 8/1999 |

* cited by examiner

*Primary Examiner*—Erika A. Gary
*Assistant Examiner*—Huy D Nguyen
(74) *Attorney, Agent, or Firm*—Katten Muchin Rosenman LLP

(57) ABSTRACT

The invention relates to a radio communication system, a base station control equipment and a mobile station equipment which constitute the radio communication system. An object of the present invention to maintain high channel capacity while adapting to geographical distribution of a mobile station which can perform soft hand-off. The base station control equipment comprises a transmission-quality measuring section for measuring the transmission qualities of reception waves arriving from mobile stations. In the process of channel control, the base station control equipment is given the allowable maximum number N of radio channels through which a BTS transmits in parallel, as a tolerable limit of interference with wireless zones formed by a local station and/or other stations. It allots, in descending order of the transmission qualities, N or less radio channels to the mobile stations which are transmitting ends of reception waves having measured transmission qualities.

11 Claims, 14 Drawing Sheets

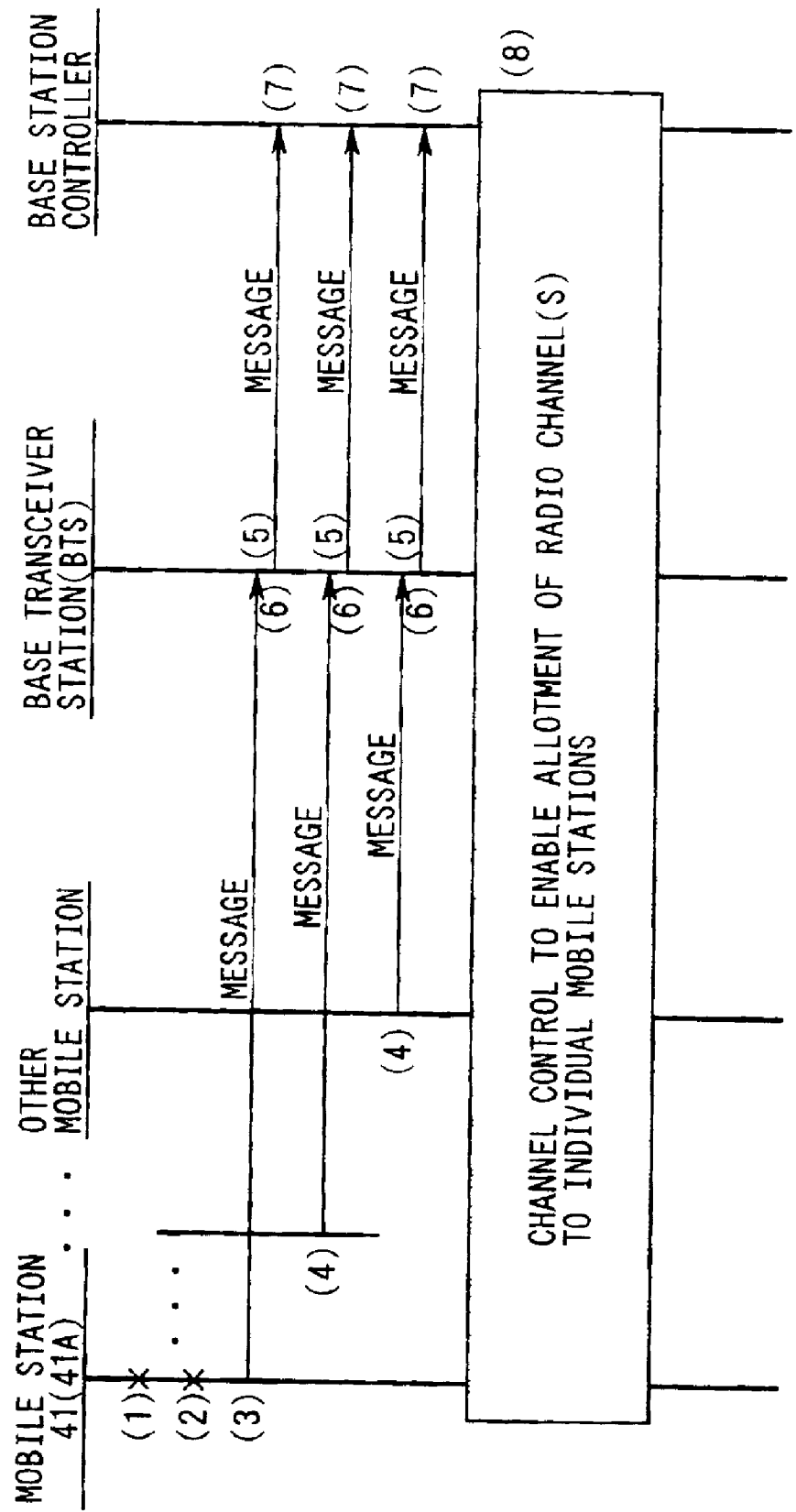

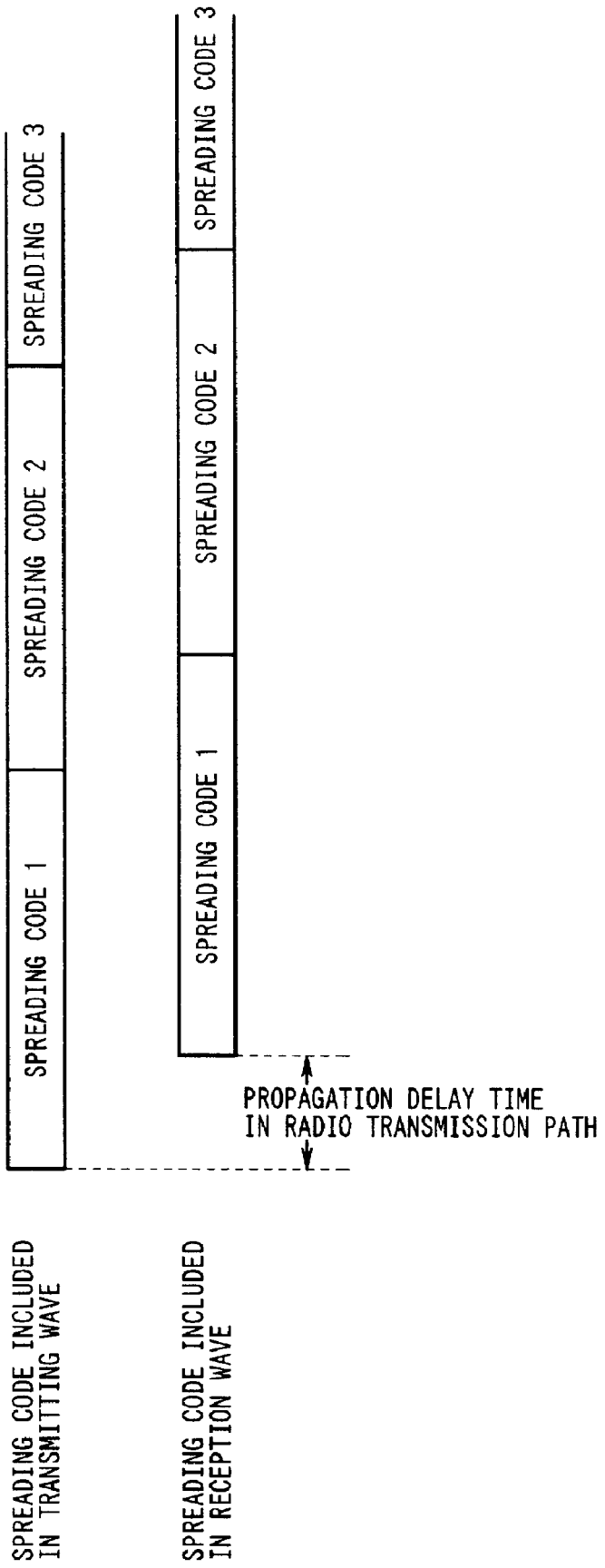

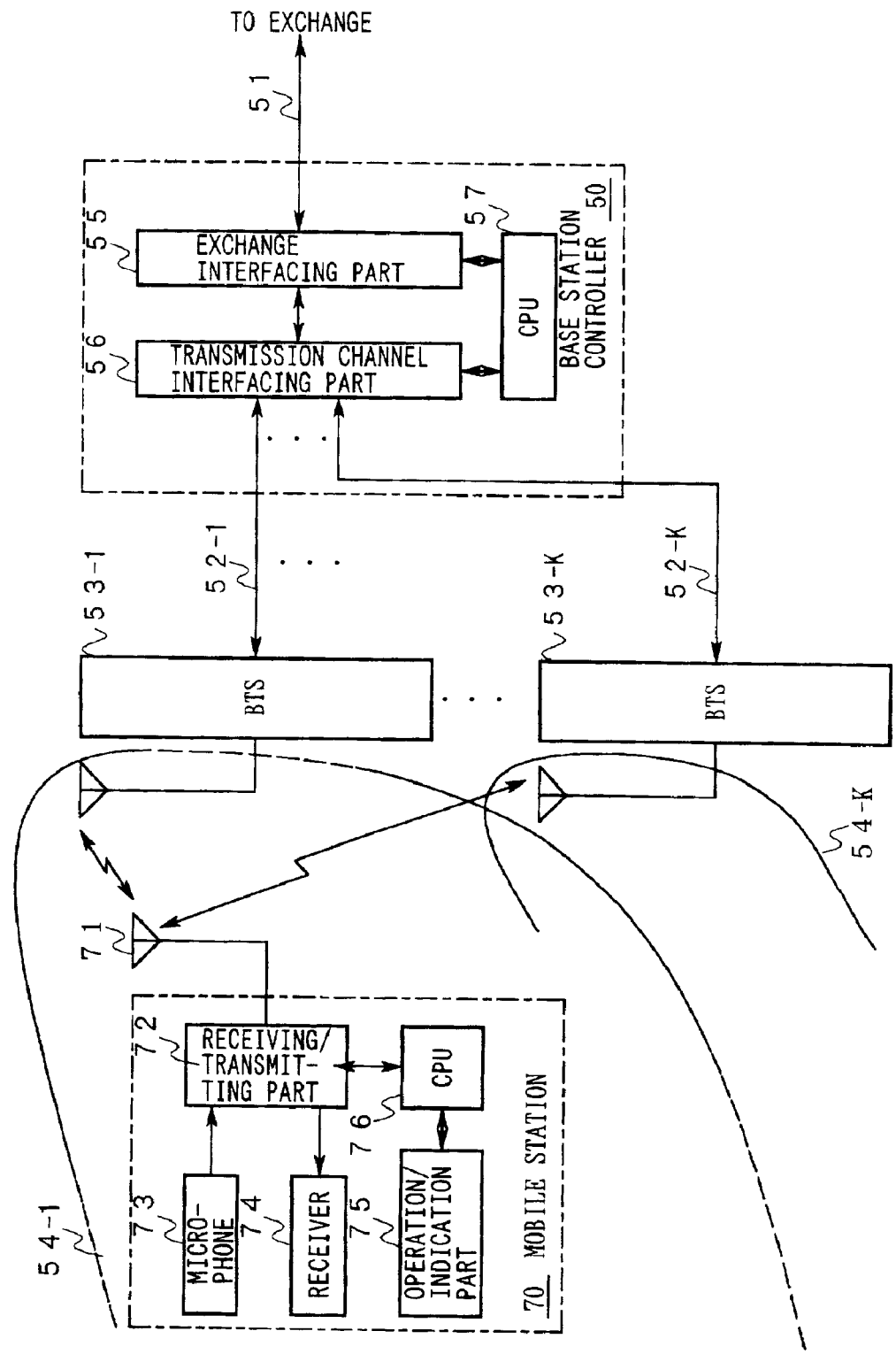

PRIOR ART  FIG. 13
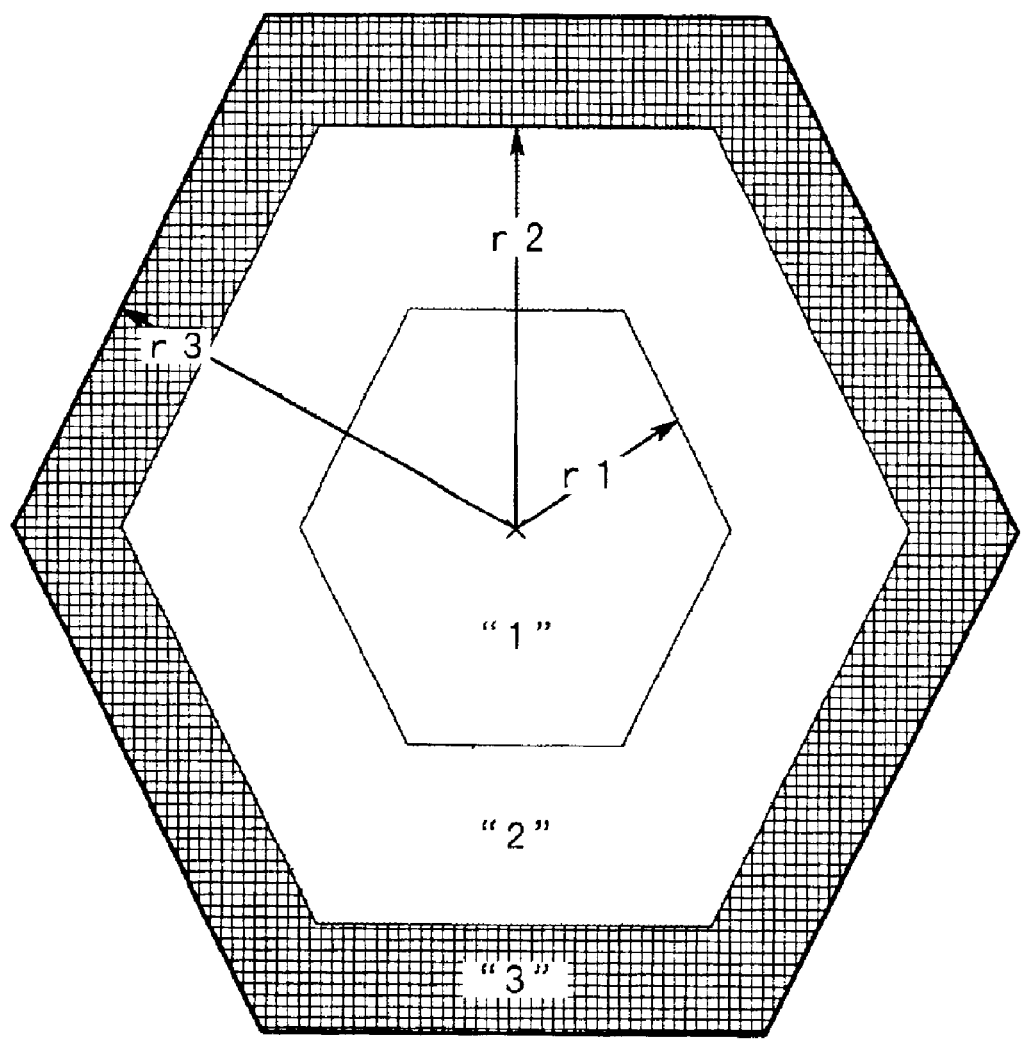

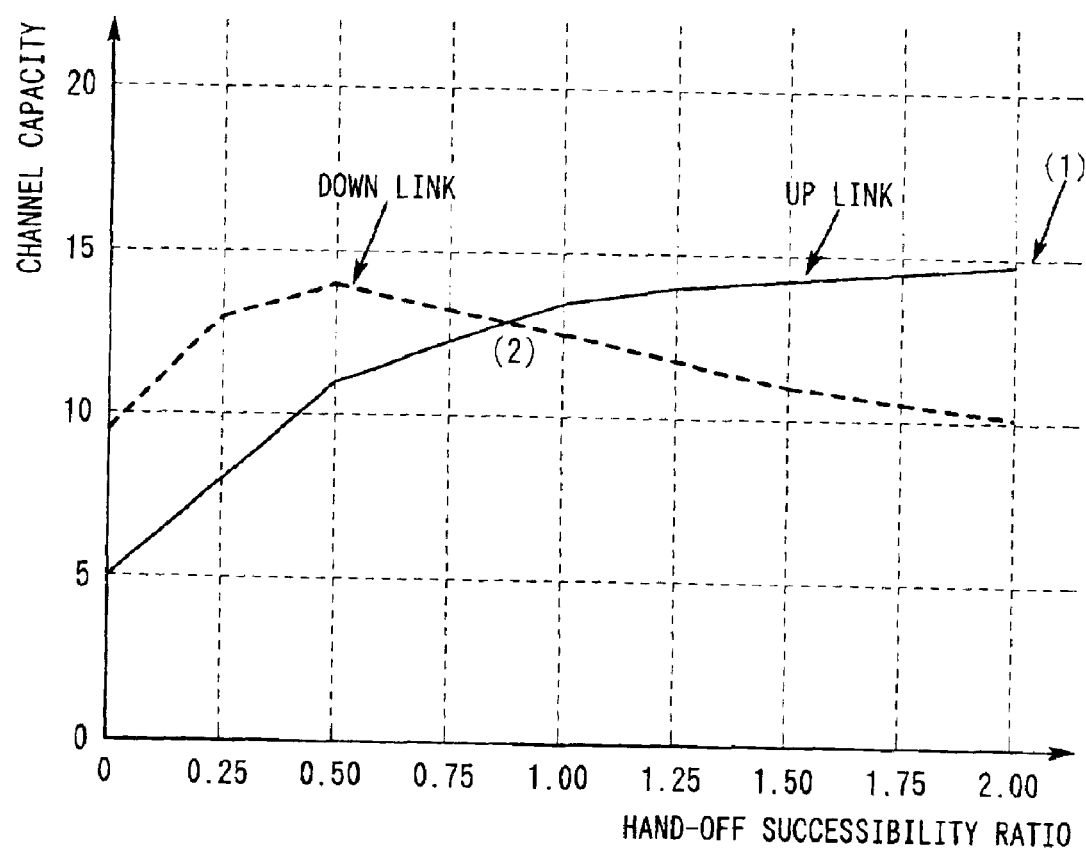
PRIOR ART FIG. 14

BASE STATION CONTROL EQUIPMENT, MOBILE STATION EQUIPMENT, AND RADIO COMMUNICATION SYSTEM

CROSS REFERENCE TO RELATED APPLICATION

This application is a continuation application under 35 USC 120 of International Application PCT/JP99/06540, filed Nov. 24, 1999, designating the U.S.

BACKGROUND OF THE INVENTION

1. Field of the Invention

The present invention relates to a base station control equipment initiatively performing channel control including soft hand-off in a radio communication system of a small zone scheme, a mobile station equipment used for providing a communication service in each wireless zone, and a radio communication system constituted by combining the base station control equipment and mobile station equipment.

2. Description of the Related Art

A CDMA system, which has confidentiality and interference resistibility as its basic nature and adapts to various channel allocations and multimedia communication, has recently been applied positively in a mobile communication system since technologies of transmit power control which can solve a near-far problem has been established.

Furthermore, in such a mobile communication system, mobile stations share a receiving/transmitting part interfacing with a radio transmission path without a great increase in a hardware scale so that they can establish and maintain individual paths in parallel with a plurality of Base Transceiver Stations (BTSs).

Consequently, the mobile stations accommodated in the mobile communication system of the CDMA system, when they locate around a border of a plurality of wireless zones, execute soft hand-off which is realized through effective use of the characteristics of the CDMA system, in cooperation with the BTSs to maintain high speech qualities of successful calls occurring in local stations.

FIG. 12 is a block diagram showing a configuration example of a mobile communication system to which the CDMA system is applied.

In FIG. 12, a base station controller 50 is connected to a not-shown exchange via a communication link 51 and is connected to BTSs 53-1 to 53-K via communication links 52-1 to 52-K respectively. A mobile station 70 locates in any of wireless zones 54-1 to 54-K formed by the BTSs 53-1 to 53-K respectively.

The base station controller 50 is composed of an exchange interfacing part 55 connected to the communication link 51, a transmission channel interfacing part 56 cascaded to this exchange interfacing part 55 and connected to one end of each of the communication links 52-1 to 52-K, and a processor (CPU) 57 connected to control terminals of these exchange interfacing part 55 and transmission channel interfacing part 56.

The mobile station 70 is composed of an antenna 71, a receiving/transmitting part 72 connected to a feeding point of this antenna 71, a microphone 73 and a receiver 74 connected to a modulation input and a demodulation output of this receiving/transmitting part 72 respectively, an operation/indication part 75, and a processor (CPU) 76 having input/output ports connected to this operation/indication part 75 and the receiving/transmitting part 72 respectively.

In the mobile communication system as configured above, when some call occurs in the mobile station 70, the processor 57 provided in the base station controller 50 transmits/receives predetermined information mutually to/from the exchange which call-processes this call via the exchange interfacing part 55 and the communication link 51, to perform channel control based on a prescribed procedure in cooperation with this exchange.

In a process of such channel control, the processor 57 transmits/receives predetermined control information via the transmission channel interfacing part 56 mutually to/from a single or a plurality of BTSs, out of the BTSs 53-1 to 53-K, which form a wireless zone where the mobile station 70 is located (supposed here to be the wireless zone 54-1 for simplification) and wireless zones adjoining the above wireless zone and which satisfy a predetermined condition, to take the initiative in processing for allotting radio channels to the aforesaid call (the mobile station 70). Note that these wireless zones are hereinafter referred to simply as 'proper zones' and a set of the BTSs forming the 'proper zones' are referred to as a 'proper BTS'.

In the mobile station 70, the processor 76 transmits/receives the aforesaid control information mutually to/from the base station controller 50 via the receiving/transmitting part 72, the antenna 71, and the whole proper BTS.

The processor 76 also specifies a single or a plurality of radio channels given as the predetermined control information and allotted to each of the aforesaid 'proper zones' (hereinafter, referred to as a 'proper channel') when it identifies that the call occurring in a local station becomes a successful call based on the prescribed procedure of the channel control. Furthermore, the processor 76 instructs the receiving/transmitting part 72 to execute transmission/receipt to be executed via each of thus specified radio channels. The receiving/transmitting part 72 transmits an upstream speech signal given via the microphone 73 to the radio channels in parallel according to this instruction and combines downstream speech signals received via the radio channels in parallel to feed the downstream speech signals to the receiver 74.

In other words, in the mobile station 70, soft hand-off is executed smoothly with the receiving/transmitting part 72 being shared so that the speech quality of the speech signal of the successful call occurring in the local station as an originating call or a terminating call is highly maintained.

Incidentally, the processor 76 performs predetermined processing according to a request for origination, a response to the terminating call, and other requests and information which are given via the operation/indication part 75, and in the process of this processing, it outputs via the operation/indication part 75, for example, information indicating that the terminating call has occurred and information indicating a set number and others when necessary.

Meanwhile, in the process of selecting the aforesaid proper zones and allotting the proper channels, the processor 57 provided in the base station controller 50 obtains, via the transmission channel interfacing part 56, levels of reception waves arriving from the mobile station 70 at BTSs which are candidates for the proper zones (hereinafter referred to as 'candidate proper BTS'), out of the BTSs 53-1 to 53-K, the levels being individually measured by these candidate proper BTSs.

The processor 57 then specifies the maximum level among thus obtained levels (hereinafter, a BTS giving the maximum level in this way is referred to as a 'reference BTS'), and based on a known constitution including a gain of an antenna system of the reference BTS and the mobile station 70, it converts the maximum level to the relative distance r of the mobile station 70 to the reference BTS.

Furthermore, the processor 57 sets the number BSH of radio channels to be used for the soft hand-off of the mobile station 70 at a larger value as the relative distance r is longer.

Incidentally, as shown in FIG. 13, this number BSH is supposed to be set, for example, at the following values relative to a first to third threshold values r1, r2, and r3 which are determined in advance:

| | | |
|---|---|---|
| | .'1' | (r . r1); |
| | .'2' | (r1 < r . r2); and |
| | .'3' | (r2 < r . r3). |

The processor 57 also selects $B_{SH}$ or less BTSs from the BTSs to which radio channels to be used effectively for a call can be allotted, and allots the proper channels individually to the selected BTSs.

In other words, the number of the proper channels allotted to any of mobile stations (including the mobile station 70) in order to realize the soft hand-off is set at a smaller value as the relative distance r to the nearest BTS is shorter, while it is set at a larger value as this relative distance r is longer.

Incidentally, a transmission characteristic of a radio transmission path formed between a mobile station and a BTS generally deteriorates to a greater extent as the aforesaid relative distance r is longer.

However, a larger number of the proper channels to be used for compensating for fluctuation of such a transmission characteristic are allotted to any of the mobile stations as the relative distance r to the nearest BTS is longer.

Furthermore, in the conventional example described above, it is avoided that a successful call precedingly occurring is preferentially allotted to available radio channels in spite of that the number of radio channels which each of the BTSs 53-1 to 53-K can allot is originally limited.

Therefore, a 'hand-off successibility ratio' is defined as the number of the proper channels which are allotted to each of the mobile stations to perform the soft hand-off. Properly selecting the mobile stations to perform the soft hand-off and properly setting the number $B_{SH}$ under the aforesaid processing can maintain high transmission quality of an uplink.

However, in the conventional example described above, the number of the radio channels through which each of the BTSs 53-1 to 53-K transmits in parallel becomes larger as the possibility that the mobile station is located in a position distant from the nearest base station is higher, which causes increase in a hardware scale and cost increase.

As for a downlink, the degree of interference with other radio channels (including radio channels allotted to the adjoining wireless zones) which are formed together with the aforesaid radio channels in a common frequency band increases, and consequently, the number of the radio channels (channel capacity) through which transmission with a desired transmission quality can be performed in parallel, sharing this frequency band, is not always maintained at a predetermined value.

Moreover, the number of the radio channels through which transmission can be performed in parallel in the above-mentioned frequency band is restricted, for example, to '64' or smaller including transmission information of radio channels used for the channel control since a code division multiple access system employing a Walsh function with a code length '64' is applied in a standardized IS-95.

In other words, the channel capacity (transmission quality) of the uplink shows a monotone increase relative to the aforesaid 'hand-off successibility ratio' as shown by the bold line in FIG. 14.

Furthermore, the channel capacity (transmission quality) of the downlink increases relative to the 'hand-off successibility ratio' in a region where the 'hand-off successibility ratio' is small as shown by the dotted line in FIG. 14.

On the other hand, in a region where the 'hand-off successibility ratio' exceeds a predetermined value (for example, '0.5'), the channel capacity (transmission quality) of the downlink decreases since the degree of the aforesaid interference increases.

Consequently, in the conventional example, when the number $B_{SH}$ is set, for example, at '3' for all the mobile stations, the 'channel capacity' is a high value of 14.7 channel/cell for the uplink (FIG. 14(1)), while it is a small value of 13.0 channel/cell for the downlink (FIG. 14(2).

Incidentally, FIG. 14 shows the result of computer simulation executed under the following conditions:

.path loss exponent.=4;
.Standard Deviation of Shadowing.=8 dB;
.shadowing correlation.=0.5;
.the maximum soft hand-off branch number=3;
.application of a RAKE receiving system by a finger number '3';
.required $E_b/N_0$ of the downlink=5 dB;
.required $E_b/N_0$ of the uplink=7 dB;
.a ratio of power allotment to radio channels except a speech channel of the downlink=0.2;
.not to execute voice activation (VOX) (a speech validity factor=1);
.to sectorize none of the wireless zones; and
.to completely execute the transmit power control.

SUMMARY OF THE INVENTION

It is an object of the present invention to provide a base station control equipment, a mobile station equipment, and a radio communication system which can maintain high channel capacities of an uplink and a downlink, flexibly adapting to geographical distribution of a mobile station which performs soft hand-off.

It is another object of the present invention to set a limit to the degree of interference occurring among radio channels which are formed in parallel in the same radio frequency band.

It is still another object of the present invention to ensure allotment of a radio channel to be used for calls of a terminal in which a successful call occurs, as well as suppression in the degree of the interference.

It is yet another object of the present invention to suppress the number of radio channels which are allotted in the process of channel control and are used for soft hand-off, and to suppress throughput required for this channel control.

Moreover, it is yet another object of the present invention to set the maximum number of mobile stations, which can perform soft hand-off in parallel, at a value suited for desired conditions such as maintenance, operation, and station installation conditions.

Furthermore, it is yet another object of the present invention to reduce with high reliability throughput required for channel control realizing soft hand-off.

Moreover, it is yet another object of the present invention to reduce the scales of hardware and software which are to be mounted in each BTS in order to determine the transmission qualities of downstream radio transmission paths.

Furthermore, it is yet another object of the present invention to apply to various forms of maintenance and operation of a radio communication system of the present invention.

It is yet another object of the present invention to reliably maintain high transmission qualities of an uplink and a downlink of a radio transmission path regardless of the positions of mobile stations as well as to suppress cost increase, improve service quality, and provide various forms of service.

The above-described objects are achieved by a base station control equipment which is given the maximum number N of radio channels through which parallel transmission is possible, as a limit to the degree of interference with wireless zones which are formed by a local station and other stations; measures individual transmission qualities of reception waves arriving from mobile stations which are possible subjects of soft hand-off; and allots, in descending order of the measured transmission qualities, radio channels to be used for the soft hand-off only to N or less mobile stations.

According to the base station control equipment as described above, the number of the radio channels can be such a small value that the degree of interference is allowable when a BTS under the equipment transmits via the radio channels to terminals where successful calls having occurred persist in parallel.

The above-described objects are also achieved by a base station control equipment which preferentially allots radio channels to be used for the soft hand-off to a terminal having the highest measured transmission quality.

According to the base station control equipment as described above, it is possible to surely allot the minimum number of radio channels, which are used for transmission/reception of speech signals, to each terminal in which successful calls occur.

The above-described objects are also achieved by a base station control equipment which determines the transmission quality only for a terminal having notified a state in which the soft hand-off can be performed based on the procedure of channel control.

According to the base station control equipment as described above, it is able to avoid unwanted increase in the number of the terminals whose transmission qualities are determined, and to which the radio channels to be used for the soft hand-off are allotted in descending order of the determined transmission qualities.

The above-described objects are also achieved by a base station control equipment in which the number N is set at a value given from the exterior, or at a suitable value for a limit given from the exterior.

According to the base station control equipment as described above, the maximum number of the radio channels, which are subjects of the soft hand-off and used for the soft hand-off in descending order of the transmission qualities, is set at a value suited for desired conditions other than the procedure of the channel control.

The above-described objects are also achieved by a mobile station equipment which is given the allowable maximum number n of radio channels to be used in parallel for soft hand-off to determine transmission qualities of individual wireless zones which a local station can identify; and notifies a state in which the local station can perform the soft hand-off, only to BTSs which form n or less wireless zones specified in descending order of the determined transmission qualities.

According to a radio communication system to which the mobile station equipment as described above is applied, the number of reception waves, whose transmission qualities are required to be determined by each base station control equipment, can be small. The quality determination is made in order to specify mobile station equipments to which radio channels used for the soft hand-off are to be allotted.

The above-described objects are also achieved by a mobile station equipment which is given the allowable maximum number n of radio channels to be used in parallel for soft hand-off and positions of base stations forming individual wireless zones where a local station can locate; measures the position of the local station; and notifies a state in which the local station can perform the soft hand-off, only to n or less BTSs specified in ascending order of their relative distances to the resultant position of the measurement.

According to a radio communication system to which the mobile station equipment as described above is applied, the number of reception waves, whose transmission qualities are required to be determined by each base station control equipment, can be small. The quality determination is made in order to specify mobile station equipments to which radio channels used for the soft hand-off are to be allotted.

The above-described objects are also achieved by a mobile station equipment in which measures the levels of reception waves arriving from each of the BTSs in wireless zones which the local station can identify, and converts the levels to the transmission qualities of downlinks of corresponding wireless zones.

According to the mobile station equipment as structured above, the transmission qualities of all of the wireless zones are determined without any dedicated hardware being mounted therein.

The above-described objects are also achieved by a mobile station equipment which measures levels of reception waves arriving from the BTSs in individual wireless zones which the local station can identify, and converts the levels to the position of the local station.

According to the mobile station equipment as structured above, the position of the local station is determined without any dedicated hardware being mounted therein.

The above-described objects are also achieved by a mobile station equipment which measures the phases of reception waves arriving from the BTSs in wireless zones which the local station can identify, and converts the phases to the transmission qualities of downlinks of corresponding wireless zones.

According to the mobile station equipment as structured above, the transmission qualities of all of the wireless zones are determined without any dedicated hardware being mounted therein.

The above-described objects are also achieved by a mobile station equipment which measures the phases of reception waves arriving from the BTSs in individual wireless zones which the local station can identify, and converts the phases to the position of the local station.

According to the mobile station equipment as structured above, the position of the local station is determined without any dedicated hardware being mounted therein.

The above-described objects are also achieved by a mobile station equipment which determines the positions of the BTSs based on positional information which is transmitted according to the procedure of channel control from the BTSs forming individual wireless zones in which the local station can locate.

According to the mobile station equipment as described above, the positions of each of the BTSs are surely obtained without any dedicated hardware being mounted therein as long as the positional information is obtainable during the process of the channel control.

The above-described objects are also achieved by a mobile station equipment which determines the allowable maximum number n of the radio channels to be used in parallel for the soft hand-off based on the procedure of channel control.

According to the mobile station equipment as described above, it is possible to apply the present invention to various forms of the channel control.

The above-described objects are also achieved by a mobile station equipment in which the allowable maximum number n of the radio channels to be used in parallel for the soft hand-off is set in advance at a value suitable for an attribute of the local station or is set appropriately based on the procedure of channel control.

According to the mobile station equipment as described above, it is possible to adapt to the forms of service to be provided to the local station.

The above-described objects are also achieved by a radio communication system which is constituted by combining the above base station control equipment and mobile station equipment.

According to the radio communication system as described above, it is able to realize synergistic improvements in responsiveness and usage efficiency of resources to be used for soft hand-off, in both of the base station control equipment and the mobile station equipment.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 6 is a diagram (1) explaining the operation of the embodiments;

FIG. 11 is another diagram explaining the operation of the present invention;

FIG. 12 is a block diagram showing a configuration example of a mobile communication system to which a CDMA system is applied;

FIG. 13 is a chart showing the number of proper channels allotted to a mobile station in a conventional example; and FIG. 14 is a chart showing channel capacity obtained relative to a hand-off successibility ratio in the conventional example.

DESCRIPTION OF THE PREFERRED EMBODIMENTS

The principles of a base station control equipment according to the present invention is first explained with reference to FIG. 1.

Figure 1:
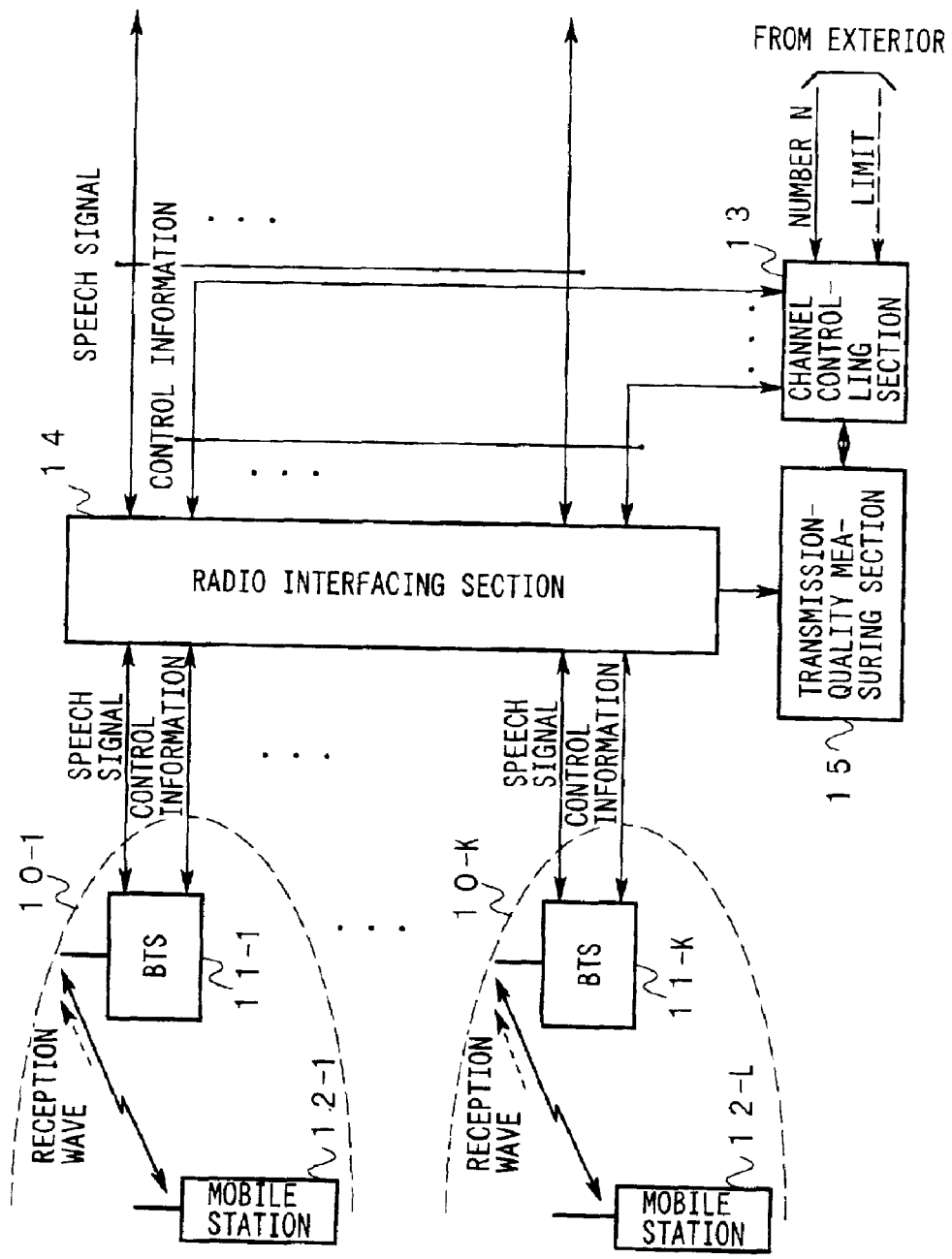
FIG. 1 is a block diagram of the principle of a base station control equipment according to the present invention.

FIG. 1 is a block diagram of the principle of the base station control equipment according to the present invention.

The base station control equipment shown in FIG. 1 is composed of a channel controlling section 13 for performing channel control of a call occurring in a single or a plurality of mobile stations 12-1 to 12-L which are located in any of a plurality of wireless zones 10-1 to 10-K, in cooperation with a plurality of BTSs 11-1 to 11-K individually forming the plural wireless zones 10-1 to 10-K, a radio interfacing section 14 for transmitting/receiving a speech signal and/or control information relating to this channel control via a radio channel which is allotted to each of the single or the plural mobile stations 12-1 to 12-L via any of the plural BTSs 11-1 to 11-K under the channel control, and a transmission-quality measuring section 15 for measuring transmission qualities of reception waves reaching all or a part of the plural BTSs 11-1 to 11-K from one of the mobile stations 12-1 to 12-L, which is a possible subject of soft hand-off under the channel control.

The principle of a first base station control equipment according to the present invention is described as follows.

The channel controlling section 13 is given the allowable maximum number N of radio channels through which the plural BTSs 11-1 to 11-K are to transmit in parallel, as a limit to the degree of interference with the wireless zones formed under control of a local station and/or other stations. Furthermore, the channel controlling section 13 allots, in descending order of these transmission qualities, N or less radio channels to be used for the soft hand-off via each of the BTS 11-1 to 11-K to the mobile stations which are transmitting ends of reception waves having transmission qualities measured by the transmission-quality measuring section 15.

According to the base station control equipment as described above, the number of the radio channels can be such a small value that the degree of interference is allowable when a BTS under the equipment transmits via the radio channels to terminals where successful calls having occurred persist in parallel.

This makes it possible to suppress mutual interference among radio channels which are formed in parallel in the same frequency band, and to increase channel capacity in the radio frequency band as well as to adapt to geographical distribution of mobile stations which perform the soft hand-off.

The principle of a second base station control equipment according to the present invention is described as follows.

The channel controlling section 13 allots a radio channel, as the radio channel to be used for transmission of the speech signal, to each of the mobile stations 12-1 to 12-L, for which the transmission qualities are determined by the transmission-quality measuring section 15, preferentially via one of the plural BTSs 11-1 to 11-K, having received a reception wave with the highest transmission quality measured by the transmission-quality measuring section 15.

According to the base station control equipment as described above, the minimum number of radio channels to be used for transmission/reception of the speech signals is surely allotted to each of the terminals in which the successful calls occur.

Therefore, the aforesaid mutual interference is surely suppressed.

The principle of a third base station control equipment according to the present invention is described as follows.

The channel controlling section 13 identifies one of the single or the plural mobile stations 12-1 to 12-L, which has notified a state in which the soft hand-off can be performed based on the procedure of channel control. The transmission-quality measuring section 15 measures the transmission qualities of only reception waves arriving from each of the mobile stations thus identified by the channel controlling section 13.

According to the base station control equipment as described above, it is able to avoid unnecessary increase in the number of the terminals whose transmission qualities are determined, and to which the radio channels to be used for the soft hand-off are allotted in descending order of the transmission qualities.

Therefore, the radio channels to be used for the transmission of the speech signals of the successful calls are surely allotted to the mobile stations while the aforesaid mutual interference is suppressed.

The principle of a fourth base station control equipment according to the present invention is described as follows.

The channel controlling section 13 is given from an exterior an allowable limit to the degree of interference with the wireless zones formed under control of a local station and/or other stations to apply a value suitable for the limit as the maximum number N of the radio channels.

According to the base station control equipment as described above, the maximum number of the radio channels, which are subjects of the soft hand-off and are used for the soft hand-off in descending order of the transmission qualities, is set at a value suitable for desired conditions other than the procedure of the channel control.

This realizes flexible adaptation to desired conditions such as maintenance, operation, and station installation conditions.

The principle of a fifth base station control equipment according to the present invention is described as follows.

The channel controlling section 13 applies a number given from an exterior as the maximum number N of the radio channels.

According to the base station control equipment as described above, the maximum number of the radio channels, which are subjects of the soft hand-off and are used for the soft hand-off in descending order of the transmission qualities, is set at a value suitable for desired conditions other than the procedure of the channel control.

This realizes flexible adaptation to desired conditions such as maintenance, operation, and station installation conditions.

The principles of a mobile station equipment according to the present invention are described next.

Figure 2:
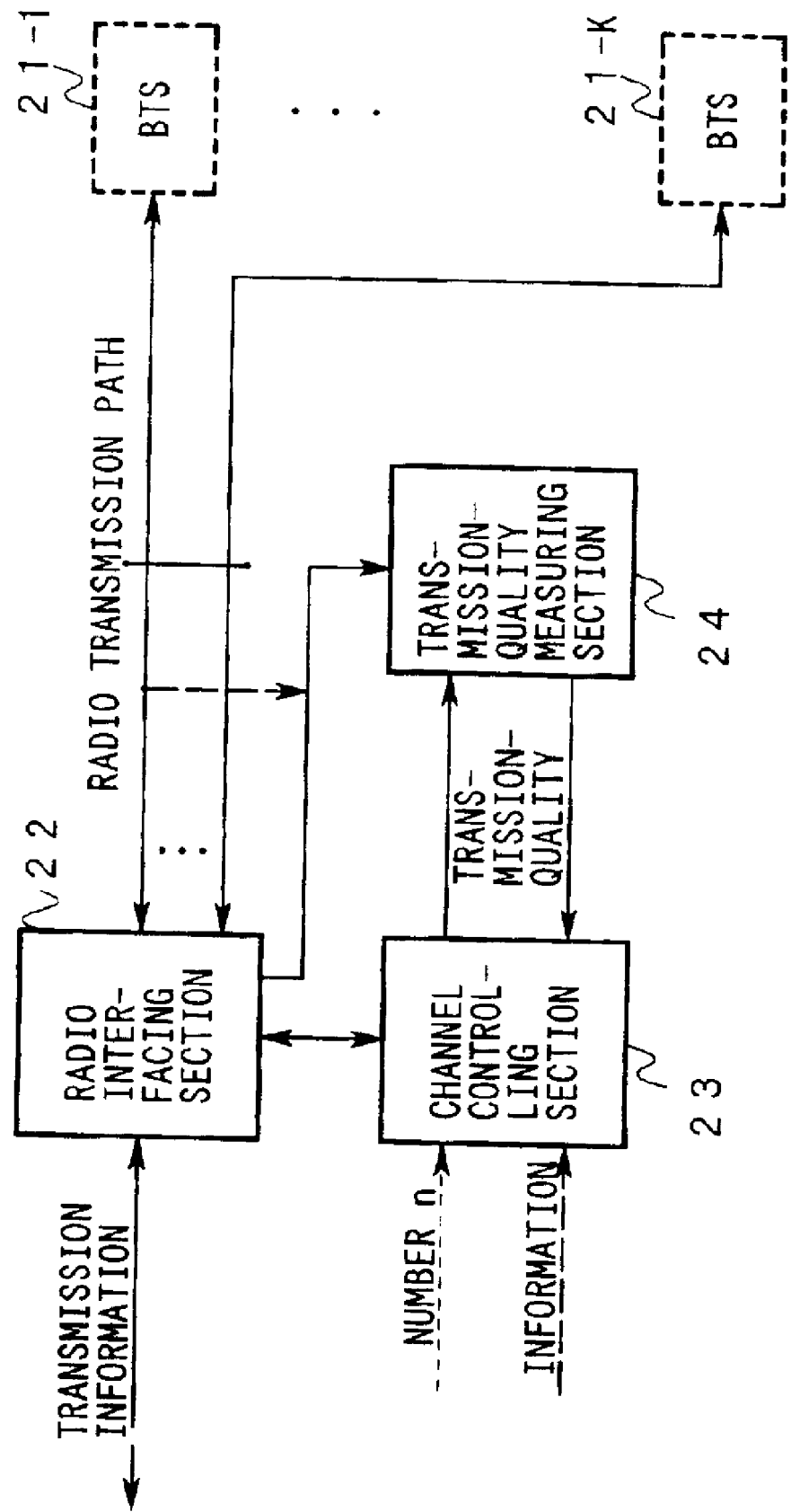
FIG. 2 is a block diagram of a first principle of a mobile station equipment according to the present invention.

FIG. 2 is a block diagram of a first principle of the mobile station equipment according to the present invention.

The mobile station equipment shown in FIG. 2 is composed of a radio interfacing section 22 which forms a radio transmission path between the equipment and a single or a plurality of BTSs 21-1 to 21-K forming wireless zones, for transmitting/receiving transmission information via the radio transmission path, a channel controlling section 23 for performing channel control of the wireless zones in cooperation with the BTSs 21-1 to 21-K via this radio interfacing section 22 and the radio transmission path formed by the radio interfacing section 22, and a transmission-quality measuring section 24 for measuring the transmission quality of a downlink of each of wireless zones which are formed by all or a part of the single or the plural BTSs 21-1 to 21-K, and which are identified in the process of the channel control by the channel controlling section 23.

The principle of a first mobile station equipment according to the present invention is described as follows.

The channel controlling section 23 is given the allowable maximum number n of radio channels to be used in parallel for soft hand-off of a local station, and when identifying a state in which the local station can perform the soft hand-off, it notifies this state to a BTS of the single or the plural BTSs 21-1 to 21-K, forming n or less wireless zones specified in descending order of the transmission qualities measured by the transmission-quality measuring section 24.

According to a radio communication system to which the mobile station equipment as described above is applied, the number of reception waves, whose transmission qualities are required to be determined by each base station control equipment, can be small. The quality determination is made in order to specify mobile station equipments to which radio channels used for the soft hand-off are to be allotted.

Therefore, throughput required for the channel control relating to the soft hand-off can be reduced with high reliability.

Figure 3:
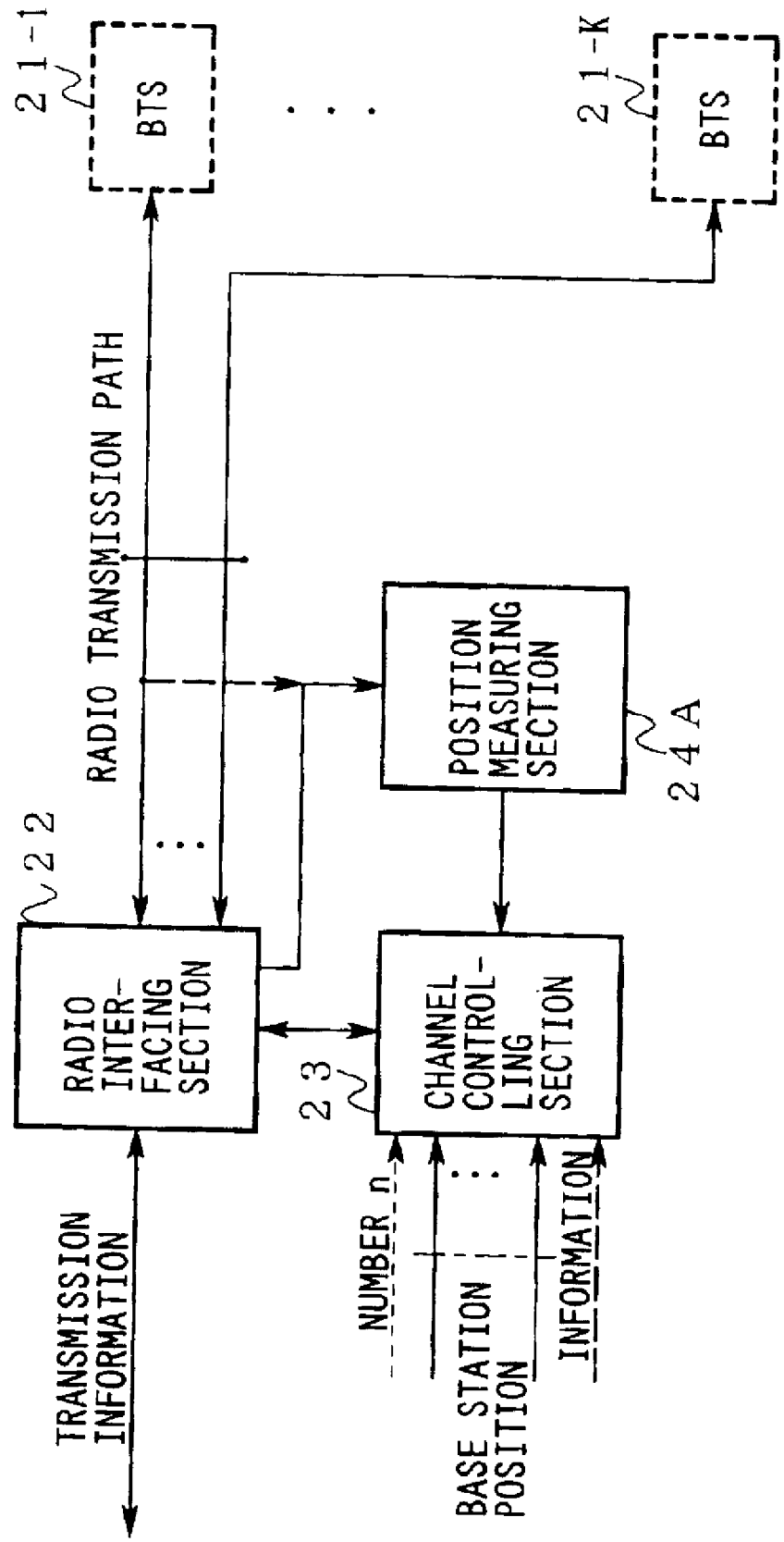
FIG. 3 is a block diagram of a second principle of the mobile station equipment according to the present invention.

FIG. 3 is a block diagram of a second principle of the mobile station equipment according to the present invention.

The mobile station equipment shown in FIG. 3 is composed of the radio interfacing section 22 which forms radio transmission paths between the equipment and the single or the plural BTSs 21-1 to 21-K forming wireless zones, for transmitting/receiving transmission information via the radio transmission paths, the channel controlling section 23 for performing channel control of the wireless zones in cooperation with the BTSs 21-1 to 21-K via this radio interfacing section 22 and the radio transmission paths formed by the radio interfacing section 22, and a position measuring section 24A for measuring the position of a local station.

The principle of a second mobile station equipment according to the present invention is described as follows.

The channel controlling section 23 is given the allowable maximum number n of radio channels to be used in parallel for soft hand-off of a local station, and base-station positions indicating the positions of all or a part of the BTSs 21-1 to 21-K, and when identifying a state in which the local station can perform the soft hand-off, it notifies this state to BTSs of these BTSs 21-1 to 21-K, individually forming n or less wireless zones specified in ascending order of relative distances of the position of the local station measured by the position measuring section 24A to the corresponding base-station positions.

According to a radio communication system to which the mobile station equipment as described above is applied, the number of reception waves, whose transmission qualities are required to be determined by each base station control equipment, can be small. The quality determination is made in order to specify mobile station equipments to which radio channels used for the soft hand-off are to be allotted.

Therefore, it is possible to reduce the scale of hardware which is necessary for determining the transmission quality of a downlink and is to be mounted in each of the BTSs.

The principle of a third mobile station equipment according to the present invention is described as follows.

The transmission-quality measuring section 24 measures the level of the downlink of each of the wireless zones which are formed by all or a part of the single or the plural BTSs 21-1 to 21-K, and which are identified by the channel controlling section 23 in the process of the channel control, and converts this level to the transmission quality of the downlink.

According to the mobile station equipment as structured above, the transmission quality of any of the wireless zones is determined without any specialized hardware being mounted therein.

Therefore, the hardware scale can be reduced without any deterioration in performance.

The principle of a fourth mobile station equipment according to the present invention is described as follows.

The position measuring section 24 measures levels of downlinks of the plural wireless zones which are formed by all or a part of the single or the plural BTSs 21-1 to 21-K, and which are identified by the channel controlling section 23 in the process of the channel control, and converts the levels to the position of the local station.

According to the mobile station equipment as structured above, the position of the local station is determined without any specialized hardware being mounted therein.

Therefore, the hardware scale can be reduced without any deterioration in performance.

The principle of a fifth mobile station equipment according to the present invention is described as follows.

The transmission-quality measuring section 24 determines the phase of a reception wave received via the downlink of each of the wireless zones which are formed by all or a part of the single or the plural BTSs 21-1 to 21-K, and which are identified by the channel controlling section 23 in the process of the channel control, and converts the phase to the transmission quality of the downlink.

According to the mobile station equipment as structured above, the transmission quality of any of the wireless zones is determined without any specialized hardware being mounted therein.

Therefore, the hardware scale can be reduced without any deterioration in performance.

The principle of a sixth mobile station equipment according to the present invention is described as follows.

The position measuring section 24A determines phases of reception waves received via downlinks of individual wireless zones which are formed by all or a part of the single or the plural BTSs 21-1 to 21-K, and which are identified by the channel controlling section 23 in the process of the channel control, and converts the phases to the position of the local station.

According to the mobile station equipment as structured above, the transmission quality of any of the wireless zones is determined without any specialized hardware being mounted therein.

Therefore, the hardware scale can be reduced without any deterioration in performance.

The principle of a seventh mobile station equipment according to the present invention is described as follows.

The channel controlling section 23 obtains positional information on all or a part of the BTSs 21-1 to 21-K which have been notified from the BTSs based on the procedure of the channel control, and applies the positional information as the base-station position.

According to the mobile station equipment as described above, the position of each of the BTSs can be obtained without any specialized hardware being mounted therein as long as the aforesaid positional information is obtainable in the process of the channel control.

In a radio communication system according to the present invention, therefore, it is possible to adapt to forms of maintenance and operation.

The principle of an eighth mobile station equipment according to the present invention is described as follows.

The channel controlling section 23 obtains or calculates the allowable maximum number n of the radio channels to be used for the soft hand-off of the local station, based on the procedure of the channel control.

According to the mobile station equipment as described above, it is able to apply the present invention to various forms of the channel control.

The principle of a ninth mobile station equipment according to the present invention is described as follows.

The channel controlling section 23 obtains information indicating the form of service to be provided to the local station based on the procedure of the channel control or is given the information in advance, and it sets the allowable maximum number n of the radio channels to be used for the soft hand-off of the local station at a value suitable for the information.

According to the mobile station equipment as described above, it is possible to adapt to the forms of service to be provided to the local station.

Consequently, in the radio communication system according to the present invention, it is possible to adapt to the forms of maintenance and operation.

Figure 4:
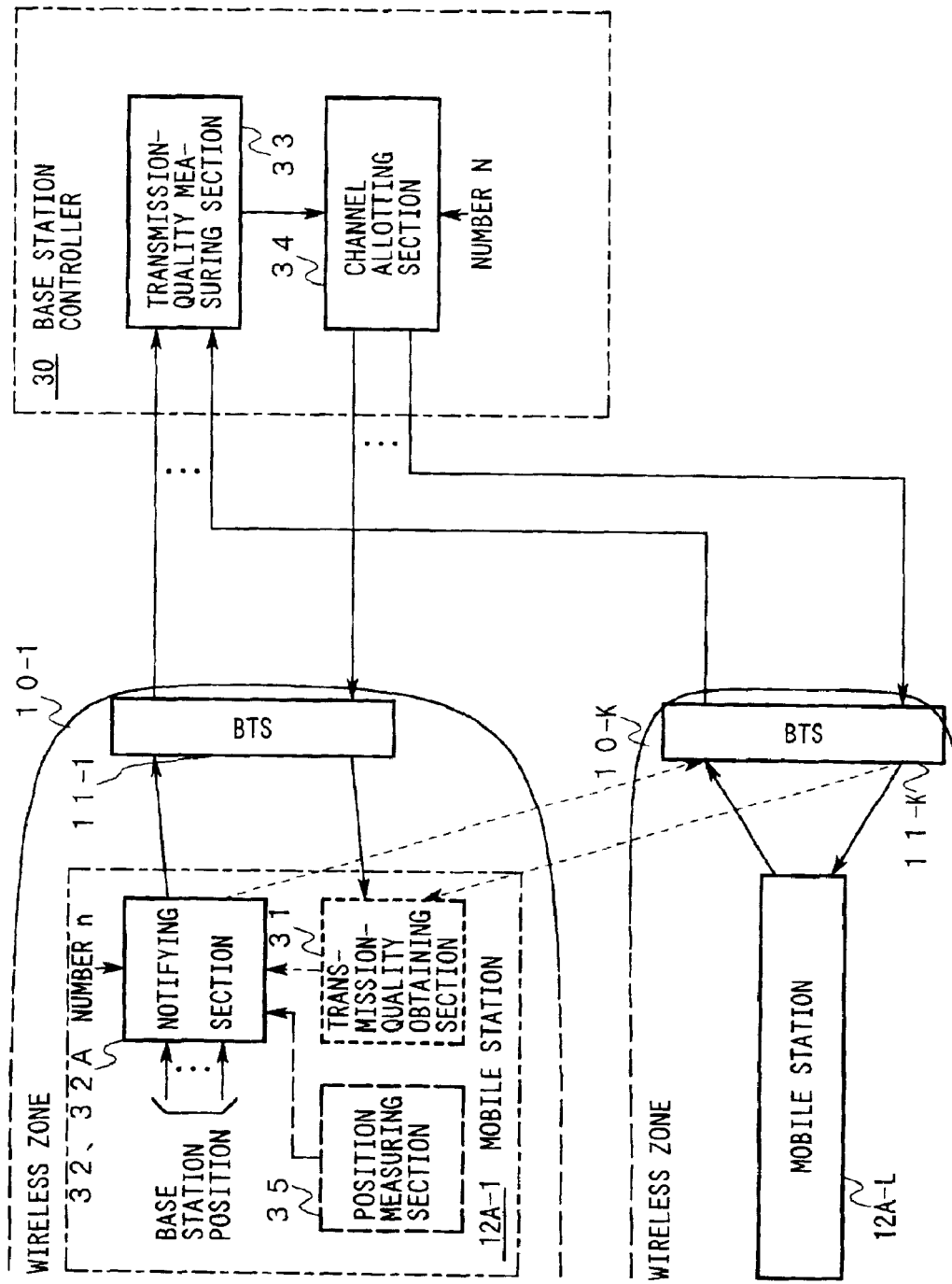
FIG. 4 is a block diagram of the principle of a radio communication system according to the present invention.

FIG. 4 is a block diagram of the principle of the radio communication system according to the present invention.

The principle of a first radio communication system according to the present invention is described as follows.

The plural BTSs 11-1 to 11-K individually form the plural wireless zones 10-1 to 10-K and a single or a plurality of mobile station equipments 12A-1 to 12A-L can be located in any of these wireless zones. The base station controller 30 performs channel control including soft hand-off for calls occurring in the aforesaid mobile station equipments 12A-1 to 12A-L, in cooperation with these BTSs 11-1 to 11-K.

Meanwhile in the single or each of the plural mobile station equipments 12A-1 to 12A-L, a transmission-quality obtaining section 31 measures transmission qualities of downlinks of all or a part of the plural wireless zones 10-1 to 10-K. A notifying section 32 is given the allowable maximum number n of radio channels to be used in parallel for soft hand-off of a local station, and is in a state in which the local station can perform the soft hand-off, it notifies this state to BTSs of the aforesaid plural BTSs 11-1 to 11-K, individually forming n or less wireless zones specified in descending order of the transmission qualities measured by the transmission-quality obtaining section 31.

In the base station controller 30, the transmission-quality measuring section 33 measures transmission qualities of reception waves in the aforesaid state arriving from the single or plural mobile station equipments 12A-1 to 12A-L. A channel allotting section 34 is given the allowable maximum number N of radio channels through which the plural BTSs 11-1 to 11-K are to transmit in parallel, and allots, in descending order of the transmission qualities, N or less radio channels used for the soft hand-off via each of the BTSs 11-1 to 11-K, to mobile stations which are transmitting ends of reception waves having transmission qualities measured by the transmission-quality measuring section 33.

According to the radio communication system as described above, it is possible to synergistically improve responsiveness and usage efficiency of resources to be used for the soft hand-off, in both of the aforesaid base station controller 30 and the mobile station equipments 12A-1 to 12A-L.

This enables running cost reduction and improvements in service quality and working efficiency relating to maintenance and operation.

The principle of a second radio communication system according to the present invention is described as follows.

The plural BTSs 11-1 to 11-K individually form the plural wireless zones 10-1 to 10-K, and the single or plural mobile station equipments 12A-1 to 12A-L can be located in any of these wireless zones. The base station controller 30 performs channel control including soft hand-off for calls occurring individually in the aforesaid mobile station equipments 12A-1 to 12A-L, in cooperation with these BTSs 11-1 to 11-K.

In the aforesaid single or plural mobile station equipments 12A-1 to 12A-L, a position measuring section 35 determines the position of the local station. A notifying section 32A is given the allowable maximum number n of radio channels to be used for the soft hand-off of the local station, and base-station positions individually indicating positions of all or a part of the single or the plural BTSs 11-1 to 11-K, and is in a state in which the local station can perform the soft hand-off, it notifies this state to BTSs of the BTSs 11-1 to 11-K, individually forming n or less wireless zones specified in ascending order of the relative positions between the position of the local station and the corresponding base-station positions which are determined by the position measuring section 35.

In the base station controller 30, the transmission-quality measuring section 33 measures transmission qualities of reception waves arriving in the aforesaid state from the single or plural mobile station equipments 12A-1 to 12A-L. A channel allotting section 34 is given the allowable maximum number N of radio channels through which the plural BTSs 11-1 to 11-K are to transmit in parallel, and allots, in descending order of the transmission qualities, N or less radio channels to be used for the soft hand-of via each of the BTS 11-1 to 11-K to mobile stations which are transmitting ends of reception waves whose transmission qualities are measured by the transmission-quality measuring section 33.

According to the radio communication system as described above, it is possible to synergistically improve responsiveness and usage efficiency of resources to be used for the soft hand-off, in both of the aforesaid base station controller 30 and the mobile station equipments 12A-1 to 12A-L.

This enables running cost reduction and improvements in service quality and working efficiency relating to maintenance and operation.

Embodiments of the present invention are hereinafter explained in detail with reference to the drawings.

Figure 5:
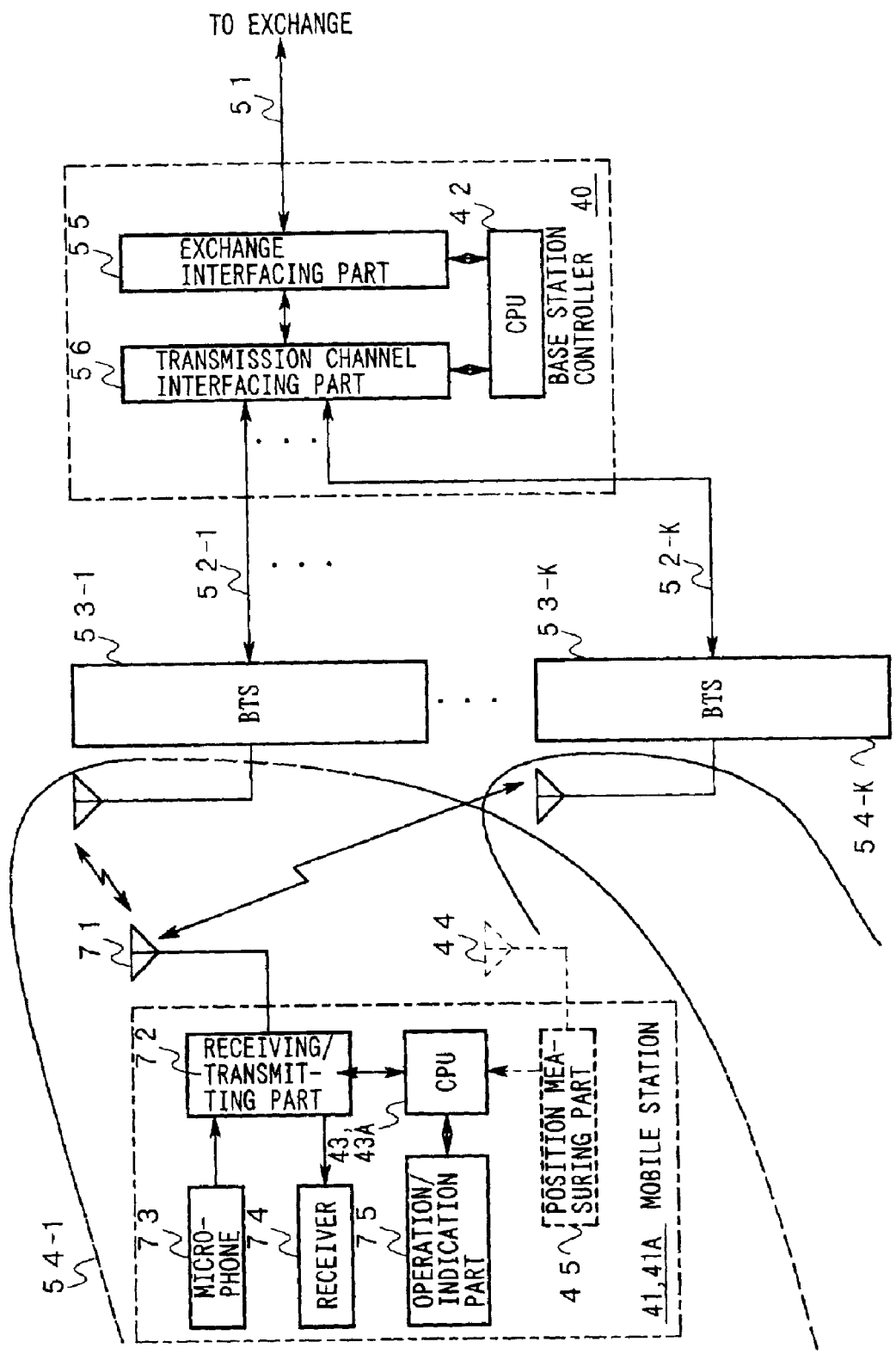
FIG. 5 is a block diagram showing an embodiment 1 to an embodiment 4 of the present invention.

FIG. 5 is a block diagram showing an embodiment 1 to an embodiment 4 of the present invention.

In FIG. 5, the same reference numerals and symbols are used to designate components having the same functions and structures as those shown in FIG. 12, and therefore, the explanations thereof are omitted here.

The embodiments are characterized in that a base station controller 40 is provided instead of the base station controller 50 and a mobile station 41 is provided instead of the mobile station 70.

The configuration of the base station controller 40 is different from that of the base station controller 50 in that a processor 42 is provided instead of the processor 57.

The configuration of the mobile station 41 is different from that of the mobile station 70 in that a processor 43 is provided instead of the processor 76.

FIG. 6 is a diagram (1) explaining the operation of the embodiments.

FIG. 7 is a diagram (2) explaining the operation of the embodiments.

Figure 8:
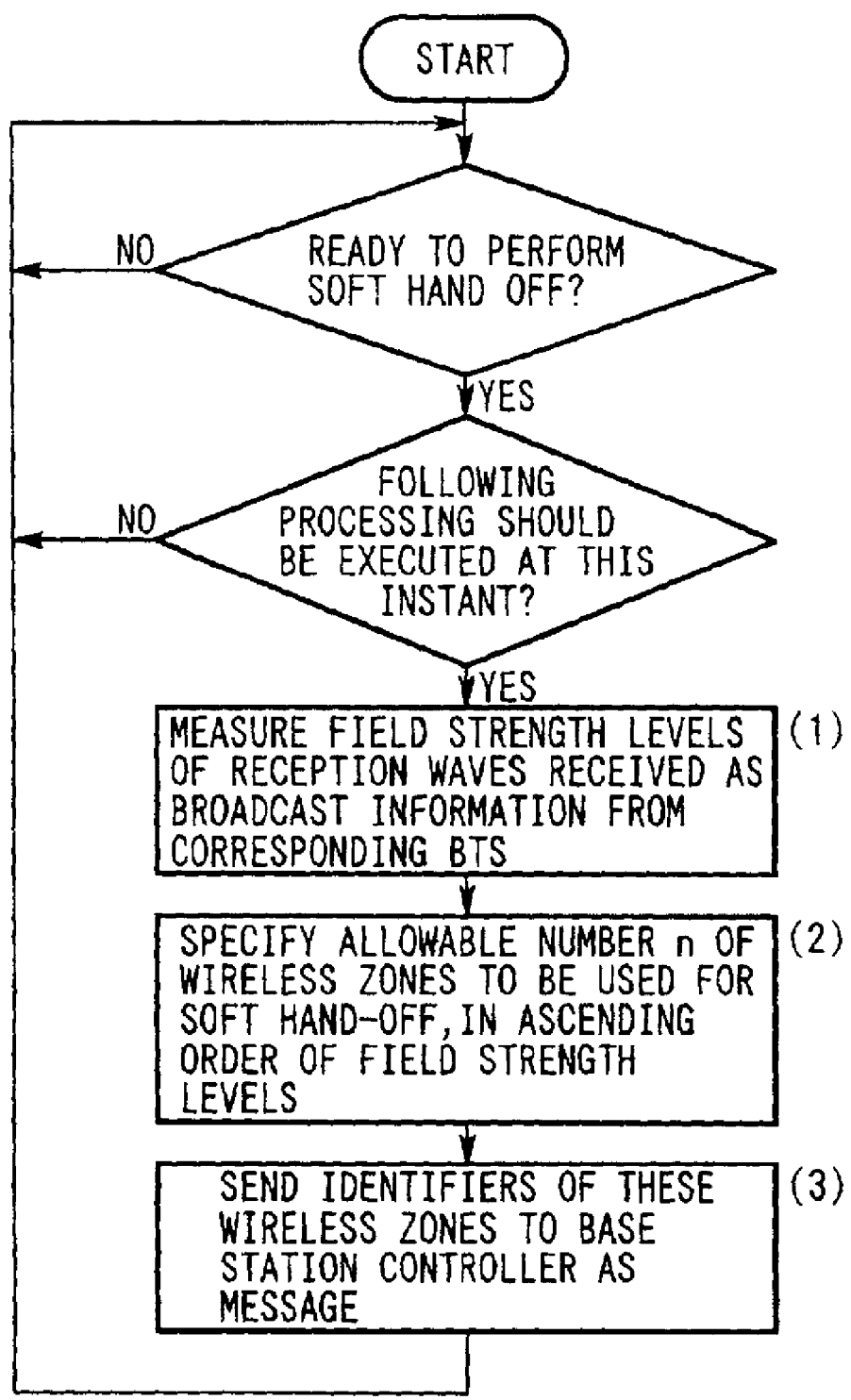
FIG. 8 is an operation flow chart of a mobile station in the embodiments.

FIG. 8 is an operation flow chart of the mobile station in the embodiments.

Figure 9:
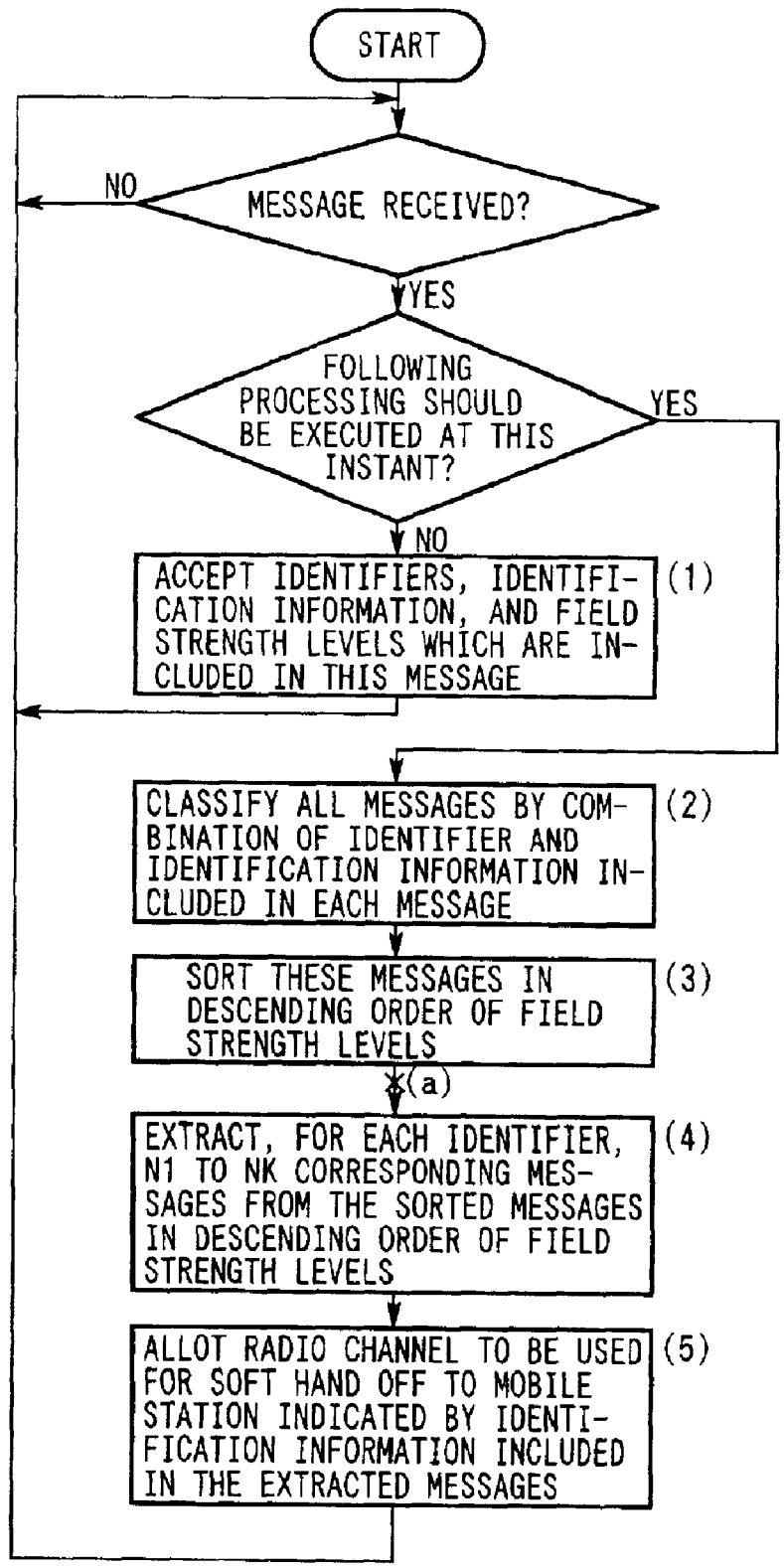
FIG. 9 is an operation flow chart of a base station controller in the embodiments.

FIG. 9 is an operation flow chart of the base station controller in the embodiments.

[Embodiment 1]

The operation of the embodiment 1 according to the present invention is hereinafter explained with reference to FIG. 5 to FIG. 9.

Incidentally, each component of the base station controller 40 and each component of the mobile station 41 associate with one another and operate in the same manner as in the conventional example except that each of them operates under control of the processors 42 and 43 as described later. Therefore, explanation of the operation of each of the components is omitted for simplification below.

In the mobile station 41, the processor 43 executes the following processing at a predetermined frequency when a state in which a local station is to be a subject of soft hand-off is identified based on the procedure of channel control, as long as this state continues.

(1) for a wireless zone which the local station visits and wireless zones adjoining this wireless zone, out of wireless zones formed by the BTSs 53-1 to 53-K, to measure field strength levels of reception waves received as broadcast information from corresponding BTSs, for example, via a perch channel and the like (FIG. 6(1) and FIG. 8(1))

Figure 7A:
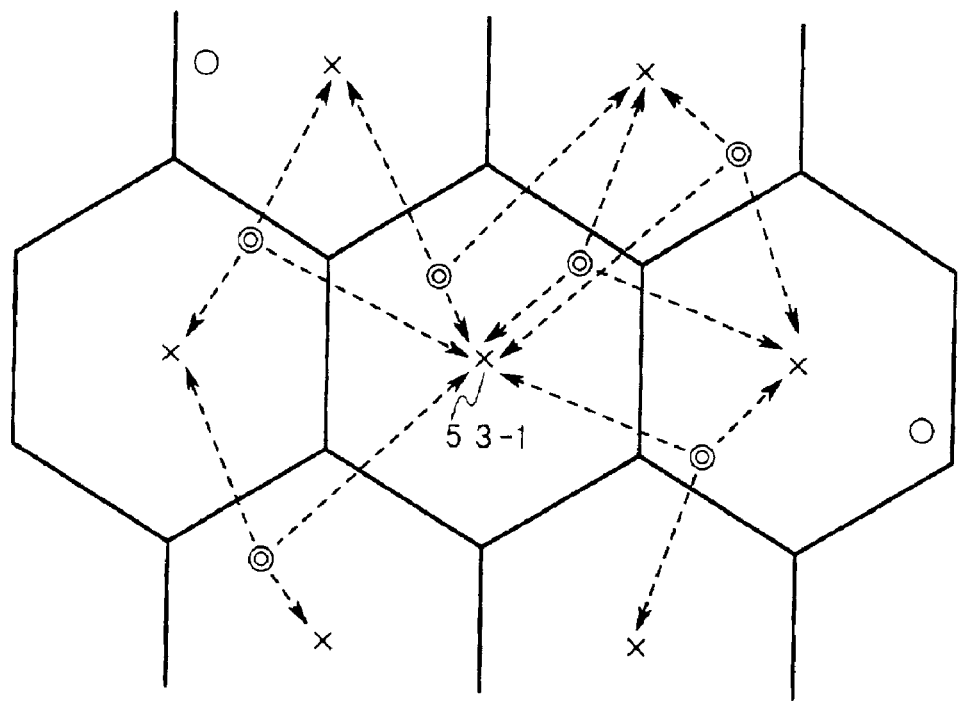
FIG. 7 is a diagram (2) explaining the operation of the embodiments.

(2) to specify BTSs individually forming wireless zones, out of the aforesaid wireless zones, which are n in number (supposed to be '3' for simplification here) and are allowed to be used for the soft hand-off by the local station, in descending order of thus measured field strength levels (FIG. 6(2), FIG. 7(a), and FIG. 9(2))

Incidentally, in FIG. 7, each of the marks 'X' represents any of the BTSs 53-1 to 53-K, each of the regions surrounded by the hexagons represents any of the wireless zones 54-1 to 54-K individually formed by these BTSs 53-1 to 53-K, and the marks '.' and '.' represent mobile stations to which the radio channels to be used for the soft hand are not allotted and mobile stations to which such radio channels are allotted respectively, out of mobile stations located in these wireless zones 54-1 to 54-K (including the mobile station 41).

(3) as shown by the dotted lines in FIG. 7(a), to transmit identifiers indicating these specified BTSs to base station controllers (including the base station controller 40) as predetermined messages (for simplification, supposed here to include identification information on the mobile station 41 and the field strength levels which are measured for the corresponding wireless zones as described above) by prescribed transmitting power (FIG. 6(3) and FIG. 7(3))

Meanwhile, all the mobile stations except the mobile station 41, when identifying the state in which the local stations are to be subjects of the soft hand-off, perform the aforesaid processing (1) to (3) to transmit similar messages to the base station controller 40 at a predetermined frequency as long as this state continues (FIG. 6(4)).

Incidentally, a value of the aforesaid prescribed transmitting power is supposed here to be a known value for the processor 42 provided in the base station controller 40 and a fixed value for simplification.

Furthermore, the number of the radio channels to be used as transmission channels for these messages in the process in which the base station controlling station 40 is notified of these messages and processing which is performed by any of the BTSs 53-1 to 53-K in order to realize selection of these radio channels and radio transmission via these radio channels are realizable under application of various technologies generally known and are not the characteristic of the present invention, and therefore, the explanations thereof are omitted here.

Meanwhile, the BTSs 53-1 to 53-K restore the messages individually reaching the local stations as reception waves (FIG. 6(5)) and notify the messages to the base station controller 40 in sequence (FIG. 6(6)).

Furthermore, the maximum numbers $N_1$ to $N_k$ of radio channels through which the BTSs 53-1 to 53-K are allowed to individually transmit in parallel respectively in order to secure desired channel capacities are given in advance to the processor 42 provided in the base station controller 40.

Furthermore, the processor 42 accepts the identifiers, the identification information, and the field strength levels as a group which are individually included in the aforesaid messages, at a predetermined frequency (FIG. 6(7) and FIG. 9(1)) to perform the following processings for every group (FIG. 6(8)).

(a) to classify all the messages by combination of the identifier and the identification information included in each of the messages (FIG. 9(2)) and sort the classified messages in descending order of the field strength levels also included in the messages (FIG. 9(3))

(b) to extract, for each of the identifiers (indicating the BTSs 53-1 to 53-K respectively) included in thus sorted messages, $N_1$ to $N_K$ corresponding messages from all the messages in descending order of the field strength levels (FIG. 9(4))

(c) to sequentially allot radio channels to be used for the soft hand-off to the mobile stations indicated by the identification information individually included in the extracted messages (FIG. 9(5))

Incidentally, the procedure of the channel control which is performed in order to realize the allotment of these radio channels, and, the contents and the forms of control information to be transmitted/received between BTSs and mobile stations in the process of the channel control are not the characteristics of the present invention, and therefore, the explanations thereof are omitted here.

(d) furthermore, to set the transmitting power of the individual allotted radio channels at the minimum value to the extent to allow the transmission quality of the radio channels to satisfy required quality under predetermined transmit power control.

In other words, in allotting the radio channels as many as the number of radio channels through which each of the BTSs 53-1 to 53-K is allowed to transmit in parallel, priority is given to the soft hand-off performed by mobile stations which are located near these BTSs 53-1 to 53-K, out of the mobile stations where successful calls which have occurred therein persist.

Figure 7B:
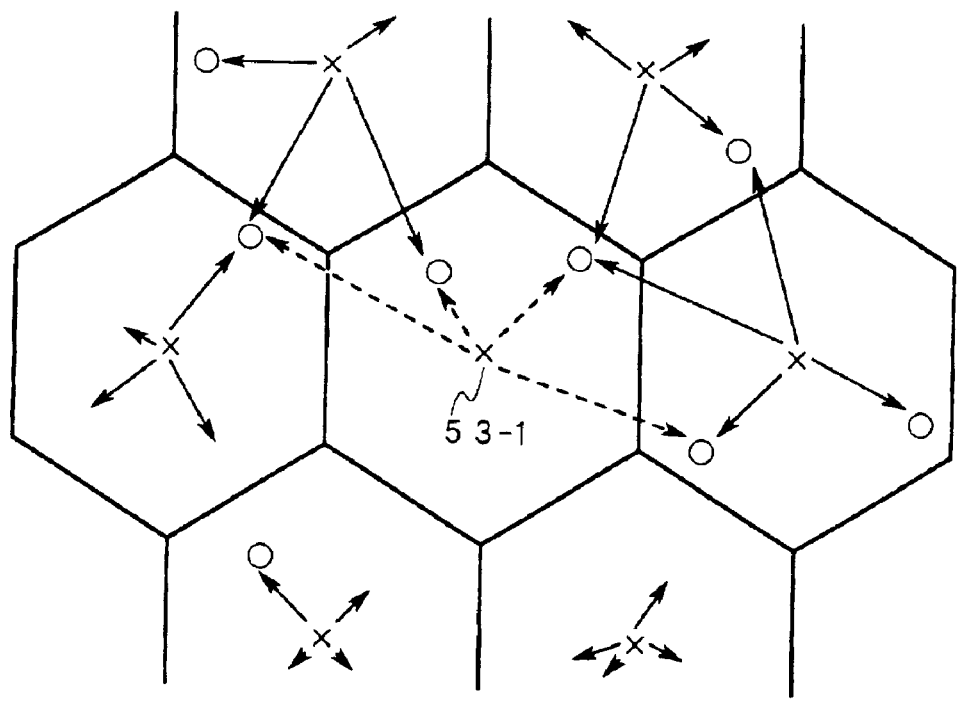

Incidentally, in the BTS 53-1, when the aforesaid number $N_1$ is, for example, '4', the radio channels to be used for the soft hand-off are allotted only to four mobile stations as shown in the doted lines in FIG. 7(b).

Moreover, a value of the power transmitted by each of the BTSs to these radio channels is suppressed at a small value under the transmit power control.

As described above, according to this embodiment, the number of the radio channels through which each of the BTSs 53-1 to 53-K is allowed to transmit in parallel is restricted to a value equal to a prescribed value or smaller and the power transmitted thereto by these BTSs 53-1 to 53-K is suppressed at a small value.

Figure 10:
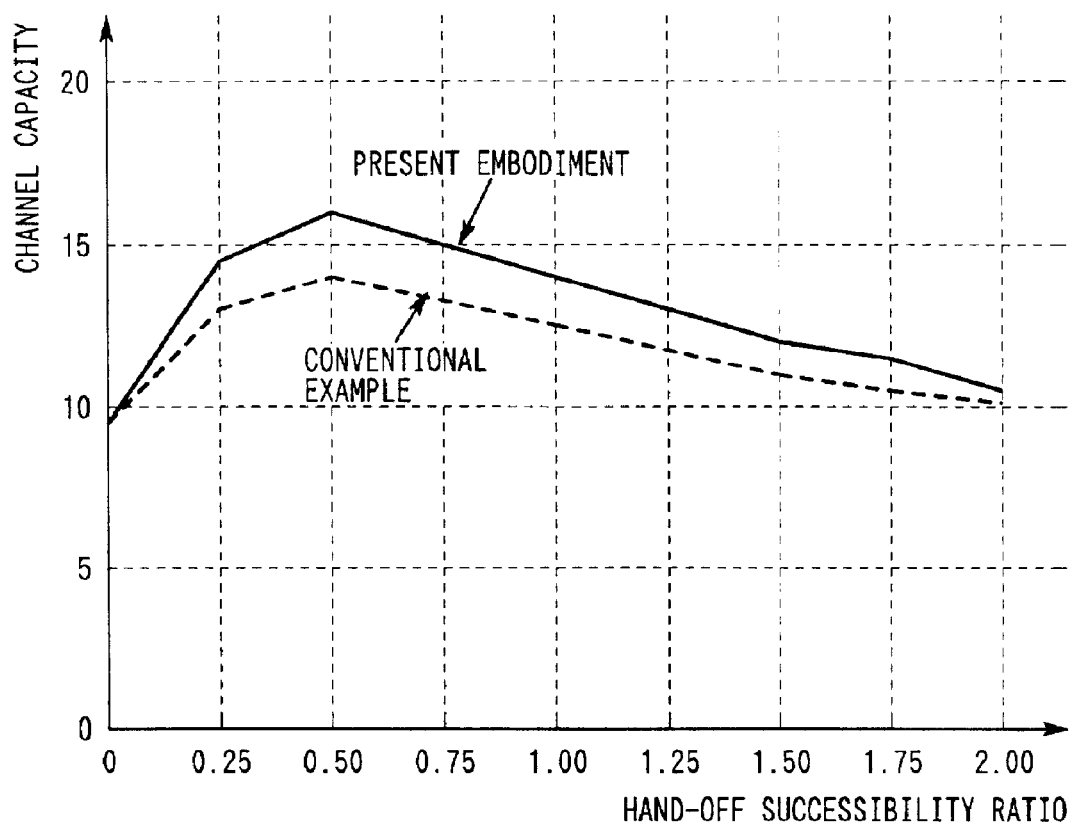
FIG. 10 is a chart showing channel capacity improved by the embodiments.

Therefore, the level of the power working as an interference wave with downlinks of these radio channels is suppressed at a small value on average, and even when the aforesaid hand-off successibility ratio is, for example, '0.5', the 'channel capacity' of the downlinks increases from 14.0 channel/cell to approximately 15.5 channel/cell as is apparent from the comparison with the conventional example shown by the dotted line in FIG. 10 and is also increased more than that in the conventional example with high reliability even in a region whose hand-off successibility ratio is still larger.

[Embodiment 2]

The operation of the embodiment 2 according to the present invention is hereinafter explained with reference to FIG. 5 and FIG. 6 to FIG. 8.

In the base station controller 40, the processor 42 accepts, at a predetermined frequency, the identifiers, the identification information, and the field strength levels as a group which are included in the individual messages given from the mobile stations (FIG. 6 (7) and FIG. 9(1)) to perform the aforesaid processings (a) to (d) for each group, and also the following processings in the process of the aforesaid processings (FIG. 6(8) and FIG. 9 (*a*)).

(A) to extract the identifier (indicating the mobile stations) included in the sorted messages (FIG. 9(3)) and merge-process the extracted identifier to generate a string of unique identifiers (B) to determine a mobile station indicated by identification information included in a message of the sorted messages, with the highest field strength level included in the string of the identifiers, as a subject to which the radio channels to be used for the soft hand-off are allotted (C) to subtract the number of the determined radio channels which are to be allotted, from the maximum numbers $N_1$ to $N_k$ of the radio channels which are given in advance respectively to the BTSs 53-1 to 53-K, and thereby determine remaining numbers $N_{r1}$ to $N_{rk}$ which are the number of remaining radio channels to be allotted.

Furthermore, the processor 42 excludes the messages including the identification information of the mobile stations which are determined to be allotted to the radio channels as described above, from the sorted messages, and thereby specifies remaining messages and from the remaining messages, extracts messages as many as the remaining numbers $N_{r1}$ to $N_{rk}$ respectively for the identifiers (indicating any of the BTSs 53-1 to 53-k) included individually in the messages, in descending order of the aforesaid field strength levels. Incidentally, the processing described above corresponds to the processing shown in FIG. 9(4).

In other words, radio channels used for transmission/reception of speech signals are surely allotted to each of the mobile stations to perform the soft hand-off, between each of the mobile stations and the BTS forming the wireless zone which each of the mobile station visits or where has the highest transmission quality.

Therefore, according to this embodiment, the 'channel capacity' of the downlink increases under the application of the present invention and furthermore, unnecessary interruption of channel control and call-processing, or deterioration in speech quality and service quality are avoided.

Incidentally, in each of the embodiments described above, the processor 43 provided in the mobile station 41 infers, based on the field strength level of a reception wave reaching the local station, the relative distance to a BTS which is a transmitting end of the reception wave.

However, the present invention is not limited to the configuration described above, and for example, some value indicating some transmission quality such as the following may be applied instead of the aforesaid field strength level:

.in a case the aforesaid reception wave is generated in a BTS which is a transmitting end of the reception wave under predetermined transmission channel coding, a number of bits which are identified in the process of decoding suitable for this transmission channel coding and whose logical value is to be corrected;

.a bit error rate determined by actual measurement;

.an error of a symbol position which is determined in the process of decision decoding and in a unit of a symbol in a signal space, or distribution of this error (a mean value is also permissible); and .instant when the aforesaid reception wave arrives and the phase of the reception wave (the phase of a spreading code (propagation delay time) included in the reception wave may also be applied as shown in FIG. 10 in a mobile communication system to which a CDMA system based on direct sequence is applied) when synchronization with the BTS which is the transmitting end is established.

[Embodiment 3]

In FIG. 5, the configuration of this embodiment is different from those of the embodiment 1 and the embodiment 2 described above in the configuration of a mobile station 41A which is provided instead of the mobile station 41.

The configuration of the mobile station 41A is different from that of the mobile station 41 in that an antenna 44 and a position measuring part 45 connected to a feeding point of this antenna 44 are provided and that a processor 43A having an input port connected to an output of this position measuring part 45 is provided instead of the processor 43.

The operation of the embodiment 3 according to the present invention is hereinafter explained with reference to FIG. 5 and FIG. 6 to FIG. 8.

This embodiment is characterized by the following processing which the processor 43A performs in cooperation with the position measuring part 45 in the mobile station 41A.

In the mobile station 41A, the position measuring part 45 receives a plurality of radio frequency signals reaching the antenna 44 (supposed to arrive from a plurality of GPS (global positioning system) satellites here for simplification) and performs predetermined processing for these radio frequency signals to generate positional information indicating the position of this antenna 44 (the mobile station 41A) and give this positional information to the processor 43A when necessary.

Furthermore, in a specific storage area of a main memory of the processor 43A, 'base-station positional information' indicating geographical positions of the BTSs 53-1 to 53-K which individually form wireless zones (supposed to be denoted by the reference numerals '54-1' to '54-K' here for simplification) in which a local station can be located is stored in advance.

Furthermore, the processor 43A, when identifying a state in which the local station is to be a subject of the soft hand-off based on the procedure of the channel control, performs the following processing i) to iv) instead of the aforesaid processing (1) and (2) at a predetermined frequency as long as this state continues.

i) for a wireless zone which the local station visits and wireless zones adjoining this wireless zone, out of the wireless zones 54-1 to 54-K formed by the BTSs 53-1 to 53-K, to receive broadcast information which is given as reception waves, for example, via a perch channel and the like, ii) to obtain the latest positional information which is given by the position measuring part 45 iii) for all the aforesaid wireless zones, to obtain differences between the 'base-station positional information' indicating the positions of the BTSs which form the aforesaid wireless zones respectively and the aforesaid 'positional information' to calculate the relative distances iv) to specify BTSs individually forming wireless zones which are n in number in ascending order of thus calculated relative distances (supposed to be '3' here for simplification), n being the number of the wireless zones which are allowed to be used for the soft hand-off by the local station (FIG. 6(2)). Incidentally, such processing corresponds to the processing shown in FIG. 8(2).

Furthermore, mobile stations except the mobile station 41A also perform the processing i) to iv) in parallel instead of the aforesaid processing (1) and (2) to similarly specify BTSs which are n in number.

In other words, each of the mobile stations determines the absolute position of the local station independently and specifies BTSs which can allot the radio channels used for the soft hand-off to the local station, in ascending order of the relative distances to the positions of the BTSs which are given in advance as the 'base-station positional information', and in addition, it can send out the aforesaid messages to these BTSs.

In this way, according to this embodiment, the mobile station 41A can determine the relative position to the nearby BTSs or desired BTSs regardless of the position of the local station as long as a prescribed number of radio frequency signals with prescribed transmission quality reach the antenna 44 from the GPS satellites.

Moreover, in this embodiment, the 'channel capacity' of the downlink is increased similarly to the embodiment 1 and the embodiment 2 described above.

Therefore, in the mobile station according to this embodiment, high service quality and speech quality are secured while flexible adaptability to landform and planimetry distribution in the periphery of the position where the local station is located is secured.

Incidentally, in this embodiment, the position of the mobile station 41A is determined by the position measuring part 44 based on navigation suitable for the GPS.

However, the position measuring part 44 is not limited to utilize such navigation, and, for example, a position measuring service provided by PHS (Personal Handyphone System) may be utilized or a technology realizing this position measuring service may be applied, and furthermore, various radio navigation and self-contained navigation may be applied, as long as physical conditions such as shape, size, weight, and others required for operating as the mobile station 41A are satisfied.

Furthermore, in this embodiment, the positions of the BTSs 53-1 to 53-K are stored in advance in the specific storage area of the main memory of the processor 43A as the aforesaid 'base-station positional information'.

However, the 'base-station positional information' may be, for example, notified to the mobile stations (including the mobile station 41A) together with the identification information as broadcast information and other messages by the BTSs 53-1 to 53-K to secure flexible adaptability to errors and variations (which may possibly result from relocation and so on) concerning the positions of the BTSs 53-1 to 53-K.

[Embodiment 4]

The operation of the embodiment 4 according to the present invention is hereinafter explained with reference to FIG. 5 to FIG. 8.

This embodiment is characterized in the procedure of the following processing performed by the processor 42 provided in the base station controller 40 and the processor 43 or 43A provided in the mobile stations 41 or 41A.

In the base station controller 40, the processor 42 monitors all or a part of the following:

.the degree of congestion and an operating status concerning this base station controller 40 (including the degree of overload of the processor 42);

.operating statuses of the communication links 52-1 and 52-2 (including the degree of congestion); and .traffic distribution, operating statuses, and the number of the radio channels which can be allotted, of the BTSs 53-1 to 53-K and/or the wireless zones formed by these BTSs 53-1 to 53-K.

The processor 42 further increases/decreases or calculates the numbers $C_1$ to $C_k$, of the radio channels which the BTSs 53-1 to 53-K can allot per single mobile station for the soft hand-off respectively, based on the results of the above monitoring.

Furthermore, the processor 42 sends out these numbers $C_1$ to $C_k$ via the BTSs 53-1 to 53-K as the broadcast information or some messages to be notified to the mobile stations (including the mobile station 41 or 41A) in the process of the channel control.

Incidentally, these numbers $C_1$ to $C_k$ may be given as a common number for all the BTSs 53-1 to 53-K.

Meanwhile, in the mobile station 41 or 41A, the processor 43 or 43A applies a number $C_i$ (1. i. K) corresponding to a wireless zone in which the local station is located, out of the numbers $C_1$ to $C_k$ which are given as the aforesaid broadcast information or messages, as the number n of the radio channels which the local station can use for the soft hand-off, in descending order of the aforesaid field strength levels (or in ascending order of the relative distances).

In this way, according to this embodiment, the mobile station 41 or 41A flexibly adapts itself to the procedure of the channel control performed in cooperation with the base station controller 40 and at the same time, can determine the number n of the radio channels to be used for the soft hand-off of the local station.

Therefore, flexible adaptability to the configuration and operating status of a system is made possible and the mobile stations which can perform the soft hand-off in parallel are able to effectively and efficiently share the radio channels which are limited resources, compared with a case when such a number n is given in advance as a constant.

Incidentally, in this embodiment, the number $C_1$ notified by the base station controller 40 is applied as the aforesaid number n of the radio channels without undergoing any processing.

However, such a number n may be determined and applied by weighting the number $C_1$ notified by the base station controller 40 with a weight according to any of the following:

.an operating status of the mobile station 41 or 41A;

.a service order (including an originating class and a terminating class) given in advance as .a subscriber of the mobile station 41 or 41A; and .an instruction given by an operator via the operation/indication part 75.

Furthermore, in each of the above embodiments, a successful call occurs in the mobile station 41 or 41A and the present invention is applied to allotment of the radio channels which are to be used for the soft hand-off which can be performed only during a period in which the successful call persists.

However, the present invention is not limited to be applied to such a successful call, and is also applicable to a case where the soft hand-off is to be performed in the process of the channel control which is performed prior to an instant when some call occurring in the mobile station 41 or 41A becomes a successful call or which is performed in response to speech termination.

Furthermore, in each of the above embodiments, the base station controller 40 performs the processing for determining the field strength levels and the relative distances only for the mobile stations which are the transmitting ends of the aforesaid messages (FIG. 6(3)).

However, in the present invention, when all the mobile stations which can perform the soft hand-off in parallel are specified by the base station controller 40 with desired accuracy and allowance of throughput is sufficiently secured, the processing for determining such field strength levels and relative distances may be performed for all of these mobile stations.

In this case, any of the mobile stations including the mobile station 41 or 41A need not send out the aforesaid messages (FIG. 6(3)).

Moreover, in each of the above embodiments, the maximum numbers $N_1$ to $N_k$ of the radio channels through which the BTSs 53-1 to 53-K are allowed to individually transmit in parallel respectively in order to secure desired channel capacity are given to the base station controller 40 in advance.

However, these maximum numbers $N_1$ to $N_k$ may be appropriately set or updated according to the following information and other information:

.operating statuses (including the degree of congestion and overload) of the base station controller 40, the communication links 51 and 52-1 to 52-K, and the BTSs 53-1 to 53-K;

.events identified in the process of the channel control (including events notified by an exchange which is connected via the communication link 51 based on the procedure for the call-process or the procedure for operation and maintenance); and .a command and a message given via a terminal and a communication link (neither of them is shown) which are used for operation and maintenance of a radio transmission system constituted by the base station controller 40 and the BTSs 53-1 to 53-K.

Furthermore, in each of the above embodiments, the channel control realizing the soft hand-off is performed under control of the processor 42 which is provided in the base station controller 40.

However, in the present invention, a function and/or load relating to such channel control may be distributed among the base station controller 40 and the BTSs 53-1 to 53-K in any form.

The invention is not limited to the above embodiments and various modifications may be made without departing from the spirit and the scope of the invention. Any improvement may be made in part or all of the components.

What is claimed is:

1. A base station control equipment, comprising:

a channel controlling section being cooperative with a plurality of BTSs individually forming a plurality of wireless zones, for performing channel control of a call occurring in a single or a plurality of mobile stations which is located in any of the wireless zones;

a radio interfacing section for transmitting/receiving a speech signal and/or control information relating to the channel control via a radio channel which is allotted to the single or each of the plurality of mobile stations via any of the plurality of BTSs, under the channel control performed by said channel controlling section; and a transmission-quality measuring section for measuring, under the channel control performed by said channel controlling section, transmission qualities of reception waves individually reaching all or a part of the plurality of BTSs from any of the single or the plurality of mobile stations, which is a possible subject of soft hand-off, and wherein, said channel controlling section being given a maximum number N of radio channels through which the plurality of BTSs transmits in parallel, for allotting, in descending order of the measured transmission qualities, N or less radio channels to the mobile stations via one of the BTSs as radio channels to be used for the soft hand-off, the mobile stations being transmitting ends of the reception waves with their transmission qualities measured by said transmission-quality measuring section.

2. The base station control equipment according to claim 1, wherein said channel controlling section allots, via a BTS, a radio channel preferentially to one of the single or plurality of mobile stations whose transmission quality has been measured by said transmission-quality measuring section, the radio channel being used for transmission of the speech signal, the BTS having received a reception wave having the highest measured transmission quality.

3. The base station control equipment according to claim 1, wherein:

said channel controlling section identifies one of the single or the plurality of mobile stations which has notified, based on a procedure of the channel control, a state in which the soft hand-off is feasible; and said transmission-quality measuring section measures a transmission quality of only a reception wave arriving from the identified mobile station.

4. The base station control equipment according to claim 1, wherein said channel controlling section is given from an exterior an allowable limit of interference to a wireless zone formed under control of a local station and/or other stations to apply a value suitable for the limit as the maximum number N of the radio channels.

5. The base station control equipment according to claim 1, wherein said channel controlling section applies a number given from an exterior as the maximum number N of the radio channels.

6. A mobile station equipment, comprising:

a radio interfacing section forming a radio transmission path between the mobile station equipment and a single or a plurality of BTSs which forms wireless zones, for transmitting/receiving transmission information via the radio transmission path;

a channel controlling section being cooperative with the single or the plurality of BTSs via said radio interfacing section and the radio transmission path, for performing channel control of the wireless zones; and a transmission-quality measuring section for measuring a transmission quality of a downlink of a wireless zone which is formed by all or a part of the single or the plurality of BTSs, and which is identified in a process of the channel control by said channel controlling section, and wherein being given an allowable maximum number n of radio channels which are used in parallel for soft hand-off of a local station, and when identifying a state in which the local station is feasible of the soft hand-off, said channel controlling section notifies the state to one of the single or the plurality of BTSs which forms n or less individual wireless zones specified according to the measured transmission qualities in descending order of the qualities.

7. The mobile station equipment according to claim 6, wherein said transmission-quality measuring section measures a level of a downlink of a wireless zone to convert the measured level to the transmission quality of the downlink, the wireless zone being formed by all or a part of the single or plurality of BTSs, and being identified by said channel controlling section in a process of the channel control.

8. The mobile station equipment according to claim 6, wherein said transmission-quality measuring section determines a phase of a reception wave received via a downlink of a wireless zone to convert the phase to the transmission quality of the downlink, the wireless zone being formed by all or a part of the single or the plurality of BTSs, and being identified by said channel controlling section in a process of the channel control.

9. The mobile station equipment according to claim 6, wherein said channel controlling section obtains or calculates, based on a procedure of the channel control, the allowable maximum number n of the radio channels which are used for the soft hand-off of the local station.

10. The mobile station equipment according to claim 6, wherein said channel controlling section obtains or is given in advance, based on a procedure of the channel control, information indicating a form of service to be provided for the local station, and sets the allowable maximum number n of the radio channels to be used for the soft hand-off of the local station at a value suitable for the information.

11. A radio communication system, comprising:

a single or a plurality of mobile station equipments which can be located in any of a plurality of wireless zones;

a plurality of BTSs individually forming the plurality of wireless zones; and a base station controller being cooperative with said plurality of BTSs, for performing channel control of a call occurring in said single or plurality of mobile station equipments, the channel control including soft hand-off, and wherein said single or plurality of mobile station equipments each includes:

a transmission-quality obtaining section for measuring transmission qualities of downlinks of all or a part of the plurality of wireless zones; and a notifying section being given an allowable maximum number n of radio channels to be used in parallel for the soft hand-off of a local station, and when identifying a state in which the local station is feasible of the soft hand-off, for notifying the state to one of the plurality of BTSs forming n or less wireless zones which are specified according to the measured transmission qualities in descending order of the qualities; and said base station controller includes:

a transmission-quality measuring section for measuring transmission qualities of reception waves arriving in the notified state from said single or plurality of mobile station equipments; and a channel allotting section being given a maximum number N of radio channels through which the plurality of BTSs can transmit in parallel, for allotting N or less radio channels to mobile stations in descending order of the measured transmission qualities via a BTS as radio channels to be used for the soft hand-off, the mobile stations being transmitting ends of the reception waves with their transmission qualities measured.

* * * * *